United States Patent
Spicer et al.

(10) Patent No.: US 12,097,464 B2
(45) Date of Patent: Sep. 24, 2024

(54) AMINE $CO_2$ SEPARATION PROCESS INTEGRATED WITH HYDROCARBONS PROCESSING

(71) Applicant: ExxonMobil Chemical Patents Inc., Baytown, TX (US)

(72) Inventors: David Spicer, Houston, TX (US); James L. Kendall, Humble, TX (US); Steven M. Slack, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 190 days.

(21) Appl. No.: 17/484,068

(22) Filed: Sep. 24, 2021

(65) Prior Publication Data
US 2023/0099742 A1    Mar. 30, 2023

(51) Int. Cl.
*B01D 53/14* (2006.01)
*B01D 53/18* (2006.01)
*F01K 7/12* (2006.01)
*F01K 17/04* (2006.01)

(52) U.S. Cl.
CPC ..... *B01D 53/1406* (2013.01); *B01D 53/1425* (2013.01); *B01D 53/185* (2013.01); *F01K 7/12* (2013.01); *F01K 17/04* (2013.01); *B01D 2252/204* (2013.01); *B01D 2257/504* (2013.01)

(58) Field of Classification Search
CPC ............ B01D 53/1406; B01D 53/1425; B01D 53/185; B01D 2252/204; B01D 2257/504; B01D 2256/24; B01D 2258/02; B01D 53/1475; F01K 7/12; F01K 17/04; Y02C 20/40; Y02P 20/129
See application file for complete search history.

(56) References Cited

U.S. PATENT DOCUMENTS

| | | | | |
|---|---|---|---|---|
| 3,758,224 A | * | 9/1973 | Migneault | F01D 1/18 415/198.1 |
| 4,545,976 A | * | 10/1985 | Osman | C01B 3/382 252/373 |
| 4,869,894 A | * | 9/1989 | Wang | C01B 3/16 423/652 |

(Continued)

FOREIGN PATENT DOCUMENTS

| | | | |
|---|---|---|---|
| EP | 2 465 595 | 6/2012 | |
| EP | 2465595 A1 | * 6/2012 | ......... B01D 53/1425 |

(Continued)

OTHER PUBLICATIONS

Fakhroleslam et al. "Thermal Cracking of Hydrocarbons for the Production of Light Olefins; A Review on Optimal Process Design, Operation, and Control" Ind. Eng. Chem. Res. 2020, 59, 27, 12288-12303 published Jun. 11, 2020 (Year: 2020).*

(Continued)

*Primary Examiner* — Stephen Hobson
(74) *Attorney, Agent, or Firm* — Siwen Chen

(57) ABSTRACT

An exhaust steam stream having an absolute pressure from 200 kPa to 1,050 kPa and shaft power are produced from an extraction turbine and/or a back-pressure turbine. The (Continued)

exhaust steam stream can be supplied to an amine regenerator of an amine $CO_2$ separation process. The shaft power can be utilized to drive equipment in a hydrocarbon processing plant such as an olefins production plant.

25 Claims, 5 Drawing Sheets

(56) References Cited

U.S. PATENT DOCUMENTS

| | | | | |
|---|---|---|---|---|
| 5,344,627 | A * | 9/1994 | Fujii | B01D 53/1418 |
| | | | | 423/220 |
| 6,395,944 | B1 * | 5/2002 | Griffiths | C07C 5/48 |
| | | | | 585/653 |
| 6,764,530 | B2 * | 7/2004 | Iijima | B01D 53/1475 |
| | | | | 95/227 |
| 6,784,320 | B2 * | 8/2004 | Mimura | B01D 53/1475 |
| | | | | 564/497 |
| 7,842,847 | B2 * | 11/2010 | Panditrao | C10G 7/00 |
| | | | | 62/620 |
| 7,901,487 | B2 * | 3/2011 | Rochelle | B01D 53/1456 |
| | | | | 95/207 |
| 8,021,464 | B2 * | 9/2011 | Gauthier | B01D 53/002 |
| | | | | 96/136 |
| 8,460,630 | B2 * | 6/2013 | Niitsuma | B01D 53/229 |
| | | | | 423/652 |
| 8,720,203 | B2 * | 5/2014 | Sasanuma | B01D 53/1425 |
| | | | | 423/220 |
| 9,216,903 | B2 * | 12/2015 | McKenna | C01B 32/50 |
| 9,580,314 | B2 * | 2/2017 | Darde | C01B 3/56 |
| 11,021,365 | B2 * | 6/2021 | Van Willigenburg | C10G 9/36 |
| 2004/0216465 | A1 * | 11/2004 | Sheppard | C01B 3/32 |
| | | | | 60/39.12 |
| 2009/0117024 | A1 * | 5/2009 | Weedon | F25J 3/0266 |
| | | | | 423/437.1 |
| 2010/0083666 | A1 * | 4/2010 | Brook | C01B 32/50 |
| | | | | 60/39.12 |
| 2010/0126180 | A1 * | 5/2010 | Forsyth | C01B 3/56 |
| | | | | 62/617 |
| 2013/0000320 | A1 * | 1/2013 | McKenna | F01K 23/10 |
| | | | | 60/780 |
| 2014/0178279 | A1 * | 6/2014 | Svendsen | B01D 53/1475 |
| | | | | 252/190 |
| 2014/0308172 | A1 * | 10/2014 | Allam | C01B 3/38 |
| | | | | 422/162 |
| 2015/0093326 | A1 * | 4/2015 | Eng | F02C 1/05 |
| | | | | 423/650 |
| 2017/0044083 | A1 * | 2/2017 | Allam | C01B 3/384 |
| 2019/0359484 | A1 * | 11/2019 | Van Willigenburg | C10G 9/36 |

FOREIGN PATENT DOCUMENTS

| | | | | |
|---|---|---|---|---|
| FR | 3142478 | A1 * | 5/2024 | C10G 2/32 |
| WO | 2020/131981 | | 6/2020 | |

OTHER PUBLICATIONS

Wright "Steam Turbine Cycle Optimization, Evaluation, and Performance Testing Considerations" GE Power Generation published Aug. 1996 (Year: 1996).*

Iniped "Q&A—What is a Back Pressure Turbine and what is a Condensing Turbine?" International Institute of Plant Engineering and Design published Aug. 10, 2016 accessed at <https://iniped.com/qa-what-is-a-back-pressure-turbine-and-what-is-a-condensing-turbine/> (Year: 2016).*

U.S. Appl. No. 17/483,939, filed Sep. 24, 2021, Entitled "Production of Hydrogen-Rich Fuel-Gas with Reduced CO2 Emission" Spicer et al.

U.S. Appl. No. 17/483,960, filed Sep. 24, 2021, Entitled "Hydrocarbon Reforming Processes with Shaft Power Production" Spicer.

U.S. Appl. No. 17/484,042, filed Sep. 24, 2021, Entitled "Integration of Hydrogen-Rich Fuel-Gas Production with Olefins Production Plant" Spicer et al.

IEAGHG Technical Review 2017-TR3 Mar. 2017 Reference Data and Supporting Literature Reviews for SMR Based Hydrogen Production with CCS, IEA Greenhouse Gas R&D Programme, 131 pages.

IEAGHG, "Techno-Economic Evaluation of SMR Based Standalone (Merchant) Plant with CCS", Feb. 2017, Feb. 2017, 286 pages.

Ullman's Encyclopedia of Industrial Chemistry, vol. 18, 2012, "Hydrogen, 2. Production" pp. 258-268.

"The Petra Nova Carbon Capture Project" MHI Brochure # ZD01-003CO2E2-A-1, 2 pages.

* cited by examiner

AMINE CO₂ SEPARATION PROCESS INTEGRATED WITH HYDROCARBONS PROCESSING

FIELD

This disclosure relates to processes for separating $CO_2$ from a gas mixture comprising $CO_2$ and processes for processing hydrocarbons. In particular, this disclosure relates to an amine $CO_2$ separation process integrated with an olefins production plant.

BACKGROUND

Ethylene and propylene (light olefins) are two of the highest volume petrochemical products manufactured. The polymer products into which they are converted have numerous applications in society ranging from food wrap films that extend produce shelf life to light-weight automotive components that contribute to reduced fuel consumption. The majority of ethylene and propylene are manufactured from hydrocarbon feedstocks by the so-called steam-cracking process in an olefins product plant. In this process the hydrocarbon feed, in the presence of steam, is subjected to very high temperatures for very short reaction times, producing a mixed product stream rich in ethylene and propylene, but also containing molecules ranging from hydrogen to fuel-oil. This mixed product stream is then immediately cooled and separated to produce a process gas stream comprising C1-C4 hydrocarbons including ethylene and propylene. The process gas stream is then compressed to a higher pressure, cooled to a very low temperature in a chill chain, and separated in distillation columns to recover, among others, an ethylene product stream and a propylene product stream. Steam turbines are typically utilized in the olefins production plant. Other hydrocarbon processing plants, such as oil refineries, and the like, also utilizes steam turbines to drive various rotary equipment. Historically, to maximize shaft power production, such steam turbines have been routinely configured to exhaust a considerable amount of a condensable steam stream at very low pressure of below 100 kPa absolute, which is then condensed using a surface condenser, resulting in substantial amount of thermal energy released to the atmosphere.

$CO_2$, a major greenhouse gas in the atmosphere, can be present in industrial gas mixtures, e.g., flue gas streams produced from combustion of hydrocarbon-containing fuel gases, intermediate gas streams in syngas production processes and $H_2$ production processes. Separation and capture of $CO_2$ from these industrial gas mixtures can be desirable in order to reduce $CO_2$ emission to the atmosphere. The separated $CO_2$ can be compressed, liquefied, transferred, sequestered, stored, or utilized to reduce its climate impact. A widely used process for separating $CO_2$ from a $CO_2$-containing gas mixture uses an amine to absorb the $CO_2$ from the gas mixture to produce a $CO_2$-rich amine stream, which is then heated in a regeneration step to separate $CO_2$ from the amine, thereby producing a $CO_2$ stream and a lean-amine stream. Significant volumes of low-pressure steam are generally consumed in the amine regeneration step. The lean-amine stream can be recycled to the absorption step.

There is a need to improve energy efficiency of a hydrocarbon processing plant such as an olefins production plant and of an amine $CO_2$ separation process. This disclosure satisfies this and other needs.

SUMMARY

A process for recovering $CO_2$ from a gas mixture comprising $CO_2$ may utilize an amine to preferentially absorb the $CO_2$ from the gas mixture to produce a $CO_2$-rich and amine-rich mixture, which can be heated in a regeneration step to separate the $CO_2$ from the amine. In hydrocarbon processing plants, such as refineries and olefins production plants, steam turbines may be used to produce shaft power needed to drive certain equipment such as compressors and pumps. It has been found that an amine absorption/regeneration process can be advantageously integrated with a hydrocarbon processing plant by using extraction turbine(s) and/or back-pressure turbine(s) producing an exhaust steam stream and shaft power. The exhaust stream has sufficient pressure such that it can be advantageously supplied to the amine regeneration step to heat the $CO_2$-rich and amine-rich mixture, and the shaft power can be used to drive equipment in the hydrocarbon processing plant. As a result, improved energy efficiency can be achieved than previous processes without such integration.

Thus, a first aspect of this disclosure relates to a process comprising one or more of the following: (i) obtaining an exhaust steam stream having an absolute pressure from 200 kPa to 1,050 kPa and shaft power from one or more extraction turbine(s) and/or back-pressure turbines, wherein the shaft power drives a device located in a hydrocarbon processing plant; (ii) providing a gas mixture stream comprising $CO_2$; (iii) feeding the gas mixture stream and a lean-amine stream comprising an amine into an absorption column; (iv) obtaining a $CO_2$-rich amine stream and a $CO_2$-depleted residual gas stream from the absorption column; (v) feeding at least a portion of the $CO_2$-rich amine stream into a separation column; (vi) heating the at least a portion of the $CO_2$-rich amine stream in the separation column using the exhaust steam stream to produce an overhead stream rich in $CO_2$ and a bottoms stream rich in the amine; and (vii) recycling at least a portion of the bottoms stream to the absorption column as at least a portion of the lean-amine stream.

DETAILED DESCRIPTION

Figure 1:
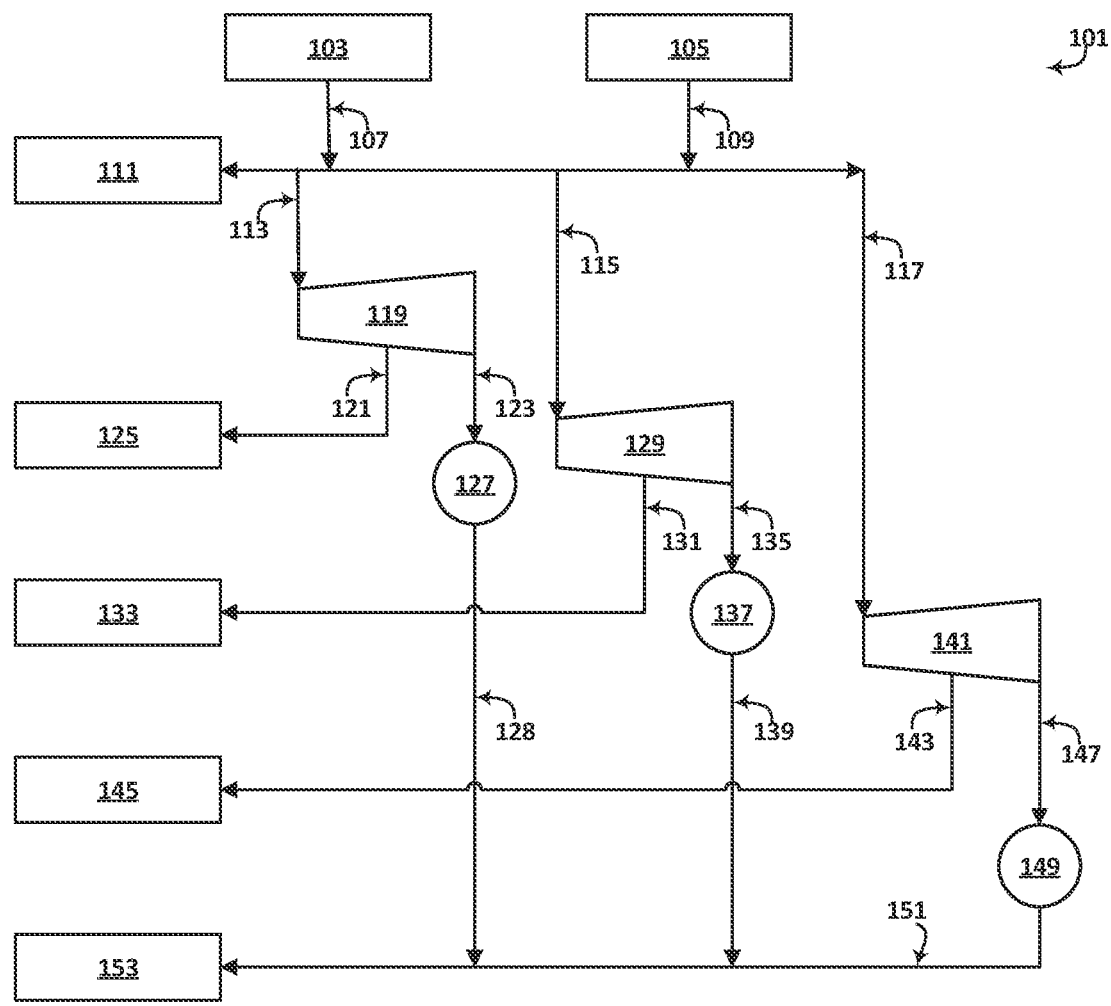
FIG. 1 schematically illustrates a steam supply/consumption system of an olefins production plant including one or more steam cracker furnaces.

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention may be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other steps, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for acquiring the measurement.

Certain embodiments and features are described herein using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated.

The indefinite article "a" or "an", as used herein, means "at least one" unless specified to the contrary or the context clearly indicates otherwise. Thus, embodiments using "a reactor" or "a conversion zone" include embodiments where one, two or more reactors or conversion zones are used, unless specified to the contrary or the context clearly indicates that only one reactor or conversion zone is used.

The term "hydrocarbon" means (i) any compound consisting of hydrogen and carbon atoms or (ii) any mixture of two or more such compounds in (i). The term "Cn hydrocarbon," where n is a positive integer, means (i) any hydrocarbon compound comprising carbon atom(s) in its molecule at the total number of n, or (ii) any mixture of two or more such hydrocarbon compounds in (i). Thus, a C2 hydrocarbon can be ethane, ethylene, acetylene, or mixtures of at least two of these compounds at any proportion. A "Cm to Cn hydrocarbon" or "Cm-Cn hydrocarbon," where m and n are positive integers and m<n, means any of Cm, Cm+1, Cm+2, ..., Cn−1, Cn hydrocarbons, or any mixtures of two or more thereof. Thus, a "C2 to C3 hydrocarbon" or "C2-C3 hydrocarbon" can be any of ethane, ethylene, acetylene, propane, propene, propyne, propadiene, cyclopropane, and any mixtures of two or more thereof at any proportion between and among the components. A "saturated C2-C3 hydrocarbon" can be ethane, propane, cyclopropane, or any mixture thereof of two or more thereof at any proportion. A "Cn+ hydrocarbon" means (i) any hydrocarbon compound comprising carbon atom(s) in its molecule at the total number of at least n, or (ii) any mixture of two or more such hydrocarbon compounds in (i). A "Cn− hydrocarbon" means (i) any hydrocarbon compound comprising carbon atoms in its molecule at the total number of at most n, or (ii) any mixture of two or more such hydrocarbon compounds in (i). A "Cm hydrocarbon stream" means a hydrocarbon stream consisting essentially of Cm hydrocarbon(s). A "Cm-Cn hydrocarbon stream" means a hydrocarbon stream consisting essentially of Cm-Cn hydrocarbon(s).

"High-pressure steam" and "HPS" are used interchangeably to mean a steam having an absolute pressure of at least 4000 kilopascal ("kPa"). "Super-high-pressure steam" and "Super-HPS" are used interchangeably to mean a steam having an absolute pressure of at least 8,370 kPa. Thus, a Super-HPS is an HPS. "Medium-pressure steam" and "MPS" are used interchangeably to mean a steam having an absolute pressure of at least 800 kPa but less than 4,000 kPa. "Low-pressure steam" and "LPS" are used interchangeably to mean a steam having an absolute pressure of at least 200 kPa but less than 800 kPa.

"Consisting essentially of" means comprising ≥60 mol %, preferably ≥75 mol %, preferably ≥80 mol %, preferably ≥90 mol %, preferably ≥95 mol %; preferably 98 mol %, of a given material or compound, in a stream or mixture, based on the total moles of molecules in the stream or mixture.

A "back-pressure steam turbine" means a steam turbine receiving a steam feed and producing no steam stream having an absolute pressure below 100 kPa and supplied to a surface condenser. Depending on the pressure of the steam feed and its configuration, a back-pressure steam turbine may produce one or more exhaust streams, e.g., an HPS stream, an MPS stream, and LPS stream, and combinations thereof.

An "extraction steam turbine" means a steam turbine receiving a steam feed and producing at least two exhaust steam streams having differing pressures. Depending on the pressure of the steam feed and its configuration, an extraction steam turbine may produce two or more steam streams including one or more of, e.g., an HPS stream, an MPS stream, an LPS stream, and an condensable stream having an absolute pressure below 100 kPa supplied to a surface condenser.

For the purposes of this disclosure, the nomenclature of elements is pursuant to the version of the Periodic Table of Elements (under the new notation) as provided in Hawley's Condensed Chemical Dictionary, $16^{th}$ Ed., John Wiley & Sons, Inc., (2016), Appendix V.

I. Integration of Amine $CO_2$ Separation with a Hydrocarbon Production Plant

Figure 5:
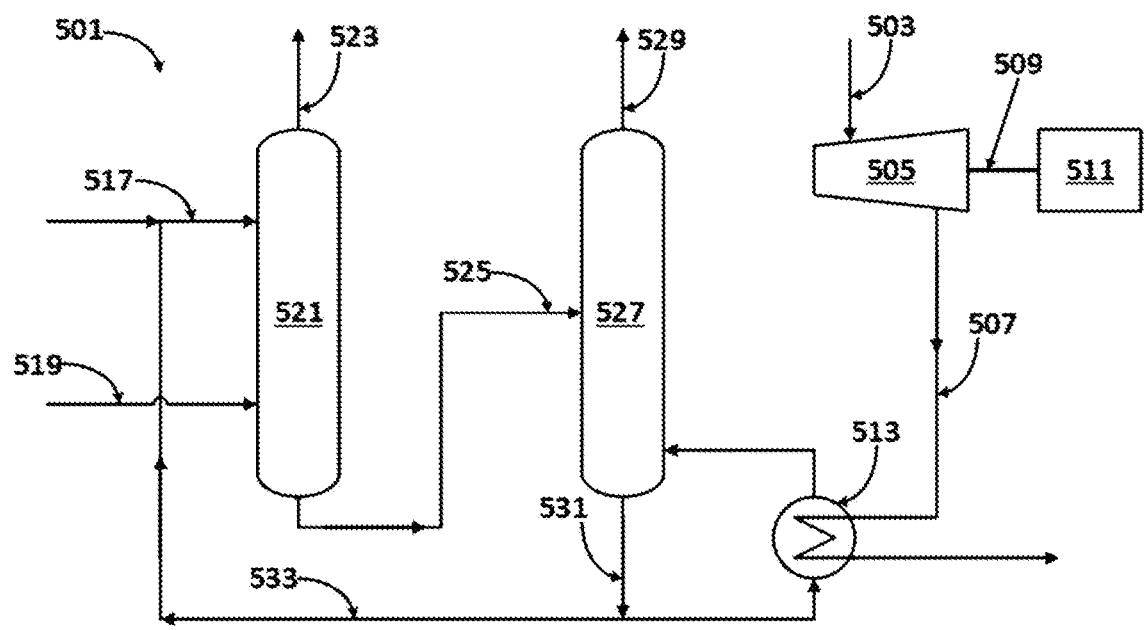
FIG. 5 schematically illustrates an embodiment of the process of this disclosure.

A first aspect of this disclosure relates to a process, an non-limiting embodiment 501 of which is illustrated in FIG. 5, comprising: (i) obtaining an exhaust steam stream (e.g., 507) having an absolute pressure from 200 kPa to 1,050 kPa and shaft power (e.g., 509) from one or more extraction turbine(s) (e.g., 505) and/or back-pressure turbine(s) (e.g., 505), wherein the one or more extraction turbine(s) (e.g., 505) and/or back-pressure turbine(s) (e.g., 505) drive a device (e.g., 511) located in a hydrocarbon processing plant; (ii) providing a gas mixture stream (e.g. 519) comprising $CO_2$; (iii) feeding the gas mixture stream (e.g., 519) and a lean-amine stream (e.g., 517) comprising an amine into an absorption column (e.g., 521); (iv) obtaining a $CO_2$-rich amine stream (e.g., 525) and a $CO_2$-depleted residual gas stream (e.g., 523) from the absorption column (e.g., 521); (v) feeding at least a portion of the $CO_2$-rich amine stream (e.g., 525) into a separation column (e.g., 527): (vi) heating the at least a portion of the $CO_2$-rich amine stream (e.g., 525) in the separation column (e.g., 527) using the exhaust steam stream (e.g., 507) to produce an overhead stream rich in $CO_2$ (e.g., 529) and a bottoms stream (e.g., 531) rich in the amine; and (vii) recycling at least a portion (e.g., 533) of the bottoms stream (e.g., 531) to the absorption column (e.g., 521) as at least a portion of the lean-amine stream (e.g., 517).

The extraction turbine(s) and/or back-pressure turbine(s) in step (i) are present in a hydrocarbon processing plant, e.g., an oil refinery, an olefins production plant, a biofuel production plant, and the like. These plants typically include equipment consuming shaft power produced by steam turbines, e.g., gas compressors at various power ratings, pumps, electricity generators, and the like. In an olefins production plant including one or more steam crackers, a steam cracking feed (e.g., ethane, propane, butanes, naphthas, gas oils, resids, crude oil, and mixtures thereof) is fed into the convection section of the steam cracker and preheated therein, and then transferred to the radiant section of the steam cracker, where it is subjected to high temperature and a short residence time, thereby producing a steam cracker effluent exiting the steam cracker comprising $H_2$, C1-C4 hydrocarbons including the desired C2-C4 olefins, and C5+ hydrocarbons. The steam cracker effluent is then immediately cooled down by quenching and/or indirect heat exchange to produce a cooled mixture, from which a process gas stream comprising $H_2$ and C1-C4 hydrocarbons including the desirable C2-C4 olefins is separated. The process gas stream is then typically compressed, using multiple compressor stages typically driven by a steam turbine(s), and then cooled down to a very low temperature in a chill train, where desirable products such as ethylene, propylene, butenes, and the like, can be recovered via cryogenic distillation. In addition, steam turbines are routinely used to drive one or more of the propylene refrigeration compressor and the ethylene refrigeration compressor included in the chill train. As discussed above, to maximize shaft power production, historically these steam turbines located in hydrocarbon processing plants (especially olefins production plants) are routinely configured to produce an exhaust steam stream having a very low pressure, e.g., ≤100 kPa, ≤80 kPa, ≤50 kPa, which is then supplied to and condensed at surface condensers with large duty ratings. Such condensing can result in release of significant amount of thermal energy into the atmosphere. In addition, surface condensers having large duty ratings are expensive to buy and operate. Therefore, it would be highly desirable to reduce the size of the surface condensers or eliminate at least some, preferably all, of them without causing problems to the operation of the devices driven by the steam turbines.

We have found that the extraction turbine(s) and/or back-pressure turbines in step (i) of the processes of this disclosure can include advantageously any steam turbines in the hydrocarbon processing plant such as an olefins production plant receiving a steam feed (e.g., 503) having a pressure higher than the exhaust steam stream (e.g., 507). Thus, the extraction turbine(s) (e.g., 505) and/or back-pressure turbine(s) (e.g., 505) may independently receive an HPS feed (e.g., 503) such as a Super-HPS feed, or an MPS feed (e.g., 503), desirably superheated. Depending on the pressure of the steam feed thereto, the extraction turbine(s) (e.g., 505) may produce, in addition to the exhaust steam stream having an absolute pressure from 200 kPa to 1,050 kPa, one or more of: (i) an HPS stream; (ii) an MPS stream; and (iii) a condensable stream supplied to a surface condenser. Preferably, if the extraction turbine(s) produce (iii) a condensable stream, the condensable stream has a quantity requiring a reduced-size surface condenser, e.g., a surface condenser having a rating of ≤80 MW, ≤60 MW, ≤50 MW, ≤40 MW, ≤20 MW, ≤10 MW, or even ≤1 MW. Depending on the pressure of the steam feed thereto, the back-pressure turbine(s) may produce, in addition to the exhaust steam stream having an absolute pressure from 200 kPa to 1,050 kPa, one or more of: (i) an HPS stream; or (ii) an MPS stream. Preferably at least one, preferably all, of the extraction turbine and/or back-pressure turbine(s) do not produce (iii) a condensable stream (e.g., a steam stream having an absolute pressure ≤100 kPa) supplied to a surface condenser. In the case of an olefins production plant, the extraction turbine(s) and/or the back-pressure turbine(s) can include one or more of: the steam turbines driving the process gas compressors; the steam turbine(s) driving the propylene refrigeration compressor(s); the steam turbine(s) driving the ethylene refrigeration compressor(s); the steam turbine(s) driving various air compressors; the steam turbine(s) driving various pumps, and the steam turbine(s) driving electricity generator(s), and combinations thereof.

The pressure of the exhaust steam stream (e.g., 507) having an absolute pressure from 200 kPa to 1,050 kPa may be produced by a single extraction turbine (e.g., 505) or back-pressure turbine (e.g., 505). Alternatively, the exhaust steam stream (e.g., 507) can be a joint stream of several such exhaust steam streams having similar pressures produced from multiple extraction turbine(s) (e.g., 505) and/or back-pressure turbine(s) (e.g., 505). This pressure range is particularly advantageous for supplying heat needed in the regeneration step of an amine $CO_2$ separation process. Thus, the exhaust steam stream (e.g., 507) can have an absolute pressure from, e.g., 200 kPa, 250 kPa, 300 kPa, 350 kPa, 400 kPa, 450 kPa, 500 kPa, to 550 kPa, 600 kPa, 650 kPa, 700 kPa, 750 kPa, 800 kPa, to 850 kPa, 900 kPa, 950 kPa, 1,000 kPa, or even 1,050 kPa. Preferably, the exhaust steam stream (e.g., 507) has an absolute pressure of no greater than 480 kPa.

The gas mixture (e.g., 519) comprising $CO_2$ can comprise $CO_2$ at various molar concentration from, e.g., 1%, 2%, 4%, 5%, 6%, 8%, 10%, to 15%, 20%, 25%, 30%, to 35%, 40%, 50%, to 55%, 60%, 65%, 70%, 75%, to 80%, 85%, or even 90%, based on the total moles of molecules in the gas mixture (e.g., 519). Preferably, the gas mixture (e.g., 519) comprises $CO_2$ at a molar concentration from 5% to 25%, based on the total moles of molecules in the gas mixture.

Non-limiting examples of the gas mixture (e.g., 519) comprising $CO_2$ include flue gases produced from combusting: (i) a fuel comprising coal; (ii) a fuel gas comprising a hydrocarbon such as natural gas; (iii) a fuel oil comprising a hydrocarbon such as diesel, kerosene, and the like; or (iv) a fuel gas comprising CO. Additional non-limiting examples of the gas mixture (e.g., 519) comprising $CO_2$ include exhaust gases and/or intermediate gas streams produced in industrial processes such as: (i) cement production; (ii) steel production; (iii) olefins production; (iv) electricity generation; (v) syngas production; and (v) hydrogen production. The gas mixture (e.g., 519) may be produced from a furnace combusting a fuel as described above. The gas mixture (e.g., 519) may be produced from a chemical reactor.

In preferred embodiments of the process of this disclosure, the gas mixture stream (e.g., 519) in step (ii) of the processes of this disclosure is produced by a syngas producing process in a syngas producing unit described in Section II below. For example, the gas mixture stream may be a stream of the first syngas, the second syngas, or the third syngas described in Section II below. In yet another preferred embodiment, the gas mixture stream in step (ii) of the processes of this disclosure is produced by the $H_2$-rich fuel gas producing process described in Section III below. For example, the gas mixture stream may be the crude gas mixture stream comprising $CO_2$, $H_2$, and optionally a hydrocarbon such as $CH_4$ in the $H_2$-rich fuel gas producing process described in Section III below. Thus, the gas mixture stream may comprise, consist essentially of, or consist of $H_2$ and $CO_2$. The gas mixture stream may comprise, consist essentially of, or consist of $H_2$, CO, and $CO_2$. The gas mixture stream may comprise, consist essentially of, or consist of $H_2$, $CO_2$, and $H_2O$. The gas mixture stream may comprise, consist essentially of, or consist of $H_2$, CO, $CO_2$, and $CH_4$. The gas mixture stream may comprise, consist essentially of, or consists of $H_2$, CO, $CO_2$, $CH_4$, and $H_2O$.

In step (iii), the gas mixture stream (e.g., 519) and a lean-amine stream (e.g., 517) comprising an amine are fed into an absorption column (e.g., 521). Any amine absorption column and amine known to one skilled in the art of $CO_2$ separation may be used. Non-limiting examples of useful amine include: monoethanolamine ("MEA"), diethanolamine ("DEA"), methyldiethanolamine ("MDEA"), diisopropanolamine ("DIPA"), diglycolamine ("DGA"), and mixtures thereof. The most commonly used amines for $CO_2$ separation and capture are DEA, MEA, and MDEA. In a preferred embodiment, the lean-amine stream (e.g., 517) is supplied to the upper section of the absorption column (e.g., 521), and the gas mixture (e.g., 517) is fed into a lower section of the absorption column (e.g., 521). Counter-current contacting between the gas mixture (e.g., 519) and the amine in the absorption column (e.g., 521) results in producing a $CO_2$-rich amine stream (e.g., 525) and a $CO_2$-depelted residual gas stream (e.g., 523) in step (iv). Preferably the $CO_2$-rich amine stream (e.g., 525) exits the absorption column from the bottom and the $CO_2$-depleted residual gas stream (e.g., 523) from the top.

In step (v), at least a portion of the $CO_2$-rich amine stream (e.g., 525) is fed into a separation column (e.g., 527). Any design of the separation column known to one skilled in the art may be used. The separation column (e.g., 527) is sometimes also called a regeneration column in that the amine is regenerated from this column. In step (vi), at least a portion of the $CO_2$-rich amine stream (e.g., 525) is heated in the separation column (e.g., 527). Such heating can be effected by using a heat exchanger (e.g., 513). At least a part, preferably ≥30%, preferably ≥50%, preferably 60%, preferably 80%, preferably ≥90%, preferably the entirety, of the thermal energy used for the heating is provided by the exhaust steam stream (e.g., 507) produced in step (i). Upon being heated to a desirable temperature, the $CO_2$ separates from the amine in the separation column, resulting in a $CO_2$-rich stream (e.g., 529) and a stream (e.g. 531) rich in the amine. Preferably, the $CO_2$-rich stream (e.g., 529) exits the separation column (e.g., 527) at the top, and the stream (e.g., 531) rich in the amine from the bottom. The stream (e.g., 531) rich in amine can be at least partly recycled (e.g., as stream 533) to the absorption column as at least a portion of the lean-amine stream (e.g., 517) in step (vii). The $CO_2$-rich stream (e.g., 529) can be compressed, liquefied, conducted away, stored, sequestered, or utilized in any suitable applications known to one skilled in the art. In one embodiment, the $CO_2$-rich stream (e.g., 529), upon optional compression, can be conducted away in a $CO_2$ pipeline. In another embodiment, the $CO_2$-rich stream (e.g., 529), upon optional compression and/or liquefaction, can be injected and stored in a geological formation. In yet another embodiment, the $CO_2$-rich stream (e.g., 529), upon optional compression and/or liquefaction, can be used in extracting hydrocarbons present in a geological formation. Another exemplary use of the $CO_2$-rich stream is in food applications.

The exhaust steam stream (e.g., 507) produced from the extraction turbine(s) (e.g., 505) and/or back-pressure turbine(s) (e.g., 505) having an absolute pressure from 200 kPa to 1,050 kPa (preferably no greater than 800 kPa, preferably no greater than 700 kPa, preferably no greater than 600 kPa, preferably no greater than 500 kPa, preferably no greater than 480 kPa, preferably no greater than 380 kPa) is particularly suitable for supplying heat to the separation column (e.g., 527) to effect the separation of $CO_2$ from the amine. One skilled in the art can extract the suitable quantity of the exhaust steam stream (e.g., 507) from the one or more extraction turbine(s) (e.g., 505) and/or back-pressure turbine (s) (e.g., 505), as illustrated below in this disclosure, to satisfy the heating duty needed in the $CO_2$/amine separation/regeneration column (e.g., 527) to effect the separation of any given quantity of the gas mixture with any $CO_2$ concentration therein. By producing the exhaust steam stream (e.g., 507) and supplying the same to the separation column (e.g., 527), residual thermal energy in the exhaust steam stream (e.g., 507) is utilized to perform useful work. This is in contrast to the prior art of producing a condensable steam stream further condensed in a surface condenser, where residual thermal energy in the condensable stream is released to the atmosphere and lost. When a hydrocarbon processing plant such as an olefins production plant including multiple large steam turbines is steam-integrated with an amine $CO_2$-separation process according to the various embodiments of this disclosure, substantial improvement in energy efficiency can be achieved, as demonstrated by the Examples in this disclosure below. Moreover, extraction of such exhaust steam stream(s) (e.g., 507) can be carried out in one or more extraction turbine(s) (e.g., 505) and/or back-pressure turbine(s) (e.g., 505), such that each turbine can still produce sufficient amount of shaft power (e.g., 509) for driving the target equipment (e.g., 511). In certain embodiments, it may be desirable to increase steam feed (e.g., 503) to one or more of the extraction turbine(s) (e.g., 505) and/or the back-pressure turbine(s) (e.g., 505) to ensure the production of both sufficient amount of shaft power (e.g., 509) and the exhaust steam stream (e.g., 507). To that end, in certain specific embodiments, one may replace an existing steam turbine with an electric motor, so that the steam required that the replaced steam turbine can be supplied to an extraction turbine and/or a back-pressure turbine producing the exhaust steam stream and the shaft power in sufficient amount. In certain embodiments, the exhaust steam stream (e.g., 507) provides a quantity of energy to the at least a portion of the $CO_2$-rich amine stream in step (vi); and at least 30% (preferably ≥50%, preferably ≥60%, preferably ≥70%) of the quantity of energy would have been lost to the atmosphere in a comparative process identical with the process except the extraction turbine or back-pressure turbine is substituted by an extraction/condensing turbine with the identical power rating.

II. The Syngas Production Process and the Syngas Producing Unit

In certain preferred embodiments, the gas mixture in step (ii) of the processes of this disclosure is produced by a syngas production process generally comprising the following steps: (A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam; (B) cooling the reformed stream by using a waste heat boiler ("WHB") to produce a cooled reformed stream and to generate a high-pressure steam ("HPS") stream; (C) heating the HPS stream to obtain a super-heated high-pressure steam ("SH-HPS") stream, wherein the SH-HPS stream has a pressure higher than the steam feed supplied to the syngas producing unit in step (A); (D) expanding at least a portion of the SH-HPS stream in at least one stage of a steam turbine to produce shaft power and an expanded steam stream having a pressure equal to or higher than the steam feed; and (E) supplying at least a portion of the expanded steam stream as the steam feed in step (A). The SH-HPS stream produced in step (C) may be supplied to an extraction turbine and/or a back-pressure turbine of step (i) of the process of this disclosure directly. Alternatively and additionally, a steam turbine may receive the SH-HPS produced in step (C) and produce an HPS or MPS stream, which can be supplied to an extraction turbine and/or a back-pressure turbine in step (i) of the process of this disclosure.

Step (A) of this process includes supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam. The hydrocarbon feed can consist essentially of C1-C4 hydrocarbons (preferably saturated), preferably consists essentially of C1-C3 hydrocarbons (preferably saturated), preferably consists essentially of C1-C2 hydrocarbons (preferably saturated), and preferably consists essentially of $CH_4$. The hydrocarbon feed and the steam feed may be combined to form a joint stream before being fed into the syngas producing unit. Alternatively, they may be fed into the syngas producing unit as separate streams, in which they admix with each other to form a mixture. The feed stream(s) can be pre-heated by, e.g., a furnace, a heat exchanger, and the like, before being fed into the syngas producing unit. The syngas producing unit can comprise a pre-reformer first receiving the feed stream(s), especially if the hydrocarbon feed comprises significant amount of C2+ hydrocarbons. In a pre-reformer, the hydrocarbon feed/steam feed mixture contacts a pre-reforming catalyst under conditions such that the C2+ hydrocarbons are preferentially converted into $CH_4$. The inclusion of a pre-reformer can reduce coking and fouling of the down-stream reforming reactor. The hydrocarbon feed may have a temperature from, e.g., 15° C., 20° C., 30° C., 40° C., to 50° C., 60° C., 70° C., 80° C., 90° C., to 95° C., 100° C., 110° C., 120° C., 130° C., 140° C., or even 150° C., and an absolute pressure from e.g., 1,300 kPa, 1,400 kPa, 1,500 kPa, 1,600 kPa, 1,700 kPa, 1,800 kPa, 1,900 kPa, 2,000 kPa, to 2,100 kPa, 2,200 kPa, 2,300 kPa, 2,400 kPa, 2,500 kPa, 2,600 kPa, 2,700 kPa, 2,800 kPa, 2,900 kPa, 3,000 kPa, to 3,000 kPa, 3,200 kPa, 3,400 kPa, 3,500 kPa, 3,600 kPa, 3,800 kPa, 4,000 kPa, to 4,200 kPa, 4,400 kPa, 4,500 kPa, 4,600 kPa, 4,800 kPa, or even 5,000 kPa. The steam feed may have a temperature from, e.g., 250° C., 260° C., 270° C., 280° C., 290° C., 300° C., to 310° C., 320° C., 330° C., 340° C., 350° C., 360° C., 370° C., 380° C., 390° C., to 400° C., 410° C., 420° C., 430° C., 440° C., or even 450° C., and an absolute pressure from e.g., 1,300 kPa, 1,400 kPa, 1,500 kPa, 1,600 kPa, 1,700 kPa, 1,800 kPa, 1,900 kPa, 2,000 kPa, to 2,100 kPa, 2,200 kPa, 2,300 kPa, 2,400 kPa, 2,500 kPa, 2,600 kPa, 2,700 kPa, 2,800 kPa, 2,900 kPa, 3,000 kPa, to 3,000 kPa, 3,200 kPa, 3,400 kPa, 3,500 kPa, 3,600 kPa, 3,800 kPa, 4,000 kPa, to 4,200 kPa, 4,400 kPa, 4,500 kPa, 4,600 kPa, 4,800 kPa, or even 5,000 kPa. Preferably, the steam feed is a superheated steam.

The effluent from the pre-reformer can be then fed into the reforming reactor operated under syngas producing conditions, wherein the forward reaction of the following is favored and desirably occurs in the presence of the reforming catalyst:

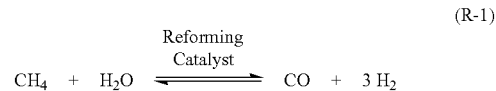

$$CH_4 + H_2O \xrightleftharpoons{\text{Reforming Catalyst}} CO + 3H_2 \quad (R\text{-}1)$$

The syngas producing condition can include a temperature of, e.g., from 750° C., 760° C., 780° C., 800° C., 850° C., 900° C., to 950° C., 1,000° C., 1,050° C., 1,100° C., to 1150° C., or even 1200° C., and an absolute pressure of, e.g., from 700 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa, in the reforming reactor, depending on the type of the reforming reactor and the syngas producing conditions. A lower pressure in the reformed stream, and hence a lower pressure in the reforming reactor, is conducive to a higher conversion of $CH_4$ in reforming reactor and hence a lower residual $CH_4$ concentration in the reformed stream. The reformed stream exiting the reforming reactor therefore comprises CO, $H_2$, residual $CH_4$ and $H_2O$, and optionally $CO_2$ at various concentrations depending on, among others, the type of the reforming reactor and the syngas producing conditions. The reformed stream can have a temperature of, e.g., from 750° C., 760° C., 780° C., 800° C., 850° C., 900° C., to 950° C., 1,000° C., 1,050° C., 1,100° C., to 1150° C., or even 1200° C., and an absolute pressure of, e.g., from 700 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa, depending on the type of the reforming reactor and the syngas producing conditions.

A preferred type of the reforming reactor in the syngas producing unit is an SMR. An SMR typically comprises one or more heated reforming tubes containing the reforming catalyst inside. The hydrocarbon/steam feed stream enters the tubes, heated to a desired elevated temperature, and passes through the reforming catalyst to effect the desirable reforming reaction mentioned above. While an SMR can have many different designs, a preferred SMR comprises a furnace enclosure, an upper convection section, a lower radiant section, and one or more burners located in the radiant section combusting a fuel to produce a hot flue gas and supply thermal energy to heat the radiant section and the convection section. The hydrocarbon/steam feed stream enters the reforming tube at a location in the convection section, winds downwards through the convection section, whereby it is pre-heated by the ascending hot flue gas produced from fuel combustion at the burner(s), and then enters the radiant section proximate the burners combustion flames, whereby it contacts the reforming catalyst loaded in the reforming tube(s) in the radiant section, to produce a reformed stream exiting the SMR from a location in the radiant section. The syngas producing conditions in the reforming tube(s) in the radiant section can include a temperature of, e.g., from 750° C., 760° C., 780° C., 800° C., to 820° C., 840° C., 850° C., to 860° C., 880° C., or even 900° C., and an absolute pressure of, e.g., from 700 kPa, 800 kPa, 800 kPa, 900 kPa, 1,000 kPa, to 1,500 kPa, 2,000 kPa, 2,500 kPa, 3,000 kPa, or even 3,500 kPa. To achieve a high $CH_4$ conversion in the SMR, and a low $CH_4$ concentration in the $H_2$-rich stream produced from the process, the syngas producing conditions in the SMR preferably includes an absolute pressure of ≤2,169 kPa (300 psig), more preferably ≤1,825 kPa (250 psig). Description of an SMR can be found in, e.g., The International Energy Agency Greenhouse Gas R&D Program ("IEAGHG"), "Techno-Economic Evaluation of SMR Based Standalone (Merchant) Plant with CCS", 2017/02, February 2017, the content of which is incorporated herein in its entirety.

The reforming reactor in the syngas producing unit may comprise an autothermal reformer ("ATR"). An ATR typically receives the hydrocarbon/steam feed(s) and an $O_2$ stream into a reaction vessel, where a portion of the hydrocarbon combusts to produce thermal energy, whereby the mixture is heated to an elevated temperature and then allowed to contact a bed of reforming catalyst to effect the desirable reforming reaction and produce a reformed stream exiting the vessel. An ATR can be operated at a higher temperature and pressure than an SMR. The syngas producing conditions in the ATR and the reformed stream exiting an ATR can have a temperature of, e.g., from 800° C., 850° C., 900° C., to 950° C., 1,000° C., 1050° C., to 1,100° C., 1,150° C., or even 1,200° C., and an absolute pressure of, e.g., from 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. Commercially available ATRs, such as the Syncor™ ATR available from Haldor Topso, having an address at Haldor Topsøes Allé 1, DK-2800, Kgs. Lyngby, Denmark, may be used in the process of this disclosure.

The syngas producing unit used in step (A) of the process of this disclosure can include one or more SMR only, one or more ATR only, or a combination of one or more of both.

The reformed stream exiting the reforming reactor has a high temperature and high pressure as indicated above. It is highly desirable to capture the heat energy contained therein. Thus, in step (B), the reformed stream passes through a waste heat recovery unit ("WHRU") to produce a cooled reformed stream and to generate a high-pressure steam ("HPS") stream. The cooled reformed stream can have a temperature from, e.g., 285° C., 290° C., 300° C., to 310° C., 320° C., 330° C., 340° C., 350° C., to 360° C., 370° C., 380° C., 390° C., or even 400° C. The cooled reformed stream can have a pressure substantially the same as the reformed stream exiting the reforming reactor. The WHRU can include, e.g., one or more heat exchanger and one or more steam drum in fluid communication with the heat exchanger. The steam drum supplies a water stream to the heat exchanger, where it is heated and can be then returned to the steam drum, where steam is separated from liquid phase water. The HPS stream can have an absolute pressure from, e.g., 4,000 kPa, 5,000 kPa, 6,000 kPa, 7,000 kPa, 8,000 kPa, to 9,000 kPa, 10,000 kPa, 11,000 kPa, 12,000 kPa, 13,000 kPa, or even 14,000 kPa. In certain embodiments, the HPS stream is preferably a Super-HPS stream. The thus produced HPS stream is a saturated steam stream.

To make the HPS stream more useful, it may be further heated in step (C) to produce a superheated HPS ("SH-HPS") stream in, e.g., a furnace. In case the syngas producing unit comprises an SMR having a convection section as described above, the saturated HPS stream may be advantageously superheated in the convection section of the SMR and/or in an auxiliary furnace. In case the syngas producing unit comprises one or more ATR but no SMR, the saturated HPS stream can be superheated in an auxiliary furnace. The auxiliary furnace can include one or more burners combusting a fuel gas stream to supply the needed thermal energy as is known to one skilled in the art. The SH-HPS stream can have one or both of: (i) a temperature from, e.g., 350° C., 360° C., 370° C., 380° C., 390° C., 400° C., to 410° C., 420° C., 430° C., 440° C., 450° C., to 460° C., 470° C., 480° C., 490° C., 500° C., to 510° C., 520° C., 530° C., 540° C., or even 550° C.; and (ii) an absolute pressure from, e.g., e.g., 4,000 kPa, 5,000 kPa, 6,000 kPa, 7,000 kPa, 8,000 kPa, to 9,000 kPa, 10,000 kPa, 11,000 kPa, 12,000 kPa, 13,000 kPa, or even 14,000 kPa. Preferably the SH-HPS stream has a temperature of at least 371° C. and the steam feed in step (A) has an absolute pressure of at least 1700 kPa. The SH-HPS stream has a pressure higher than that of the steam feed supplied to the syngas producing unit in step (A), so that the SH-HPS can be expanded to produce a steam stream having a pressure in the vicinity of the pressure of the steam feed, which can then be supplied to the syngas producing unit as at least a portion of the steam feed. Preferably the SH-HPS stream has a temperature of at least 482° C. and an absolute pressure of at least 10,000 kPa, and the steam feed has an absolute pressure of at least 1,700 kPa (e.g., at least 2,500 kPa). In a preferred embodiment, the SH-HPS stream may be supplied to an HPS header located in an industrial plant, such as an olefins production plant, supplying HPS to suitable equipment consuming SH-HPS. In another embodiment, the SH-HPS stream may be also a Super-HPS stream, and supplied to a Super-HPS header located in an industrial plant, such as an olefins production plant, supplying Super-HPS to suitable equipment consuming superheated Super-HPS.

In step (D), at least a portion of the SH-HPS stream is expanded in at least one stage of a steam turbine to produce shaft power and an expanded steam stream having a pressure equal to or higher than that of the steam feed to the syngas producing unit. The expanded steam stream may have a temperature from, e.g., 260° C., 270° C., 280° C., 290° C., 300° C., to 310° C., 320° C., 330° C., 340° C., 350° C., to 360° C., 370° C., 380° C., 390° C., 400° C., or even 405° C. The expanded steam stream has a pressure lower than the SH-HPS stream, which may range from, e.g., 1,380 kPa, 1,400 kPa, 1,500 kPa, 1,600 kPa, 1,700 kPa, 1,800 kPa, 1,900 kPa, 2,000 kPa, to 2,200 kPa, 2,400 kPa, 2,500 kPa, 2,600 kPa, 2,800 kPa, 3,000 kPa, to 3,200 kPa, 3,400 kPa, 3,500 kPa, 3,600 kPa, 3,800 kPa, 4,000 kPa, to 4,200 kPa, 4,400 kPa, or even 4,500 kPa. The expanded steam stream may be an HPS stream, or an MPS stream. The steam turbine may produce multiple exhaust streams in certain embodiments, e.g., an HPS stream and an LPS stream; an HPS stream and a condensable stream supplied to a condenser; an MPS stream and an LPS stream; or an MPS stream and a condensable stream supplied to a condenser.

Step (D) can advantageously include steam integration between a syngas producing unit and an olefins production plant including a steam cracker receiving a hydrocarbon feed and steam operated under steam cracking conditions to produce a steam cracker effluent exiting the steam cracker. The high-temperature steam cracker effluent is immediately cooled by quenching and/or an indirect heat exchanger, where a significant amount of steam may be generated, which can be subsequently superheated in the convection section of the steam cracker. The cooled steam cracker effluent can be then separated to produce, among others, a process gas stream comprising methane, ethane, C2-C4 olefins and dienes. To recover the olefins products from the process gas stream, it is typically first compressed to an elevated pressure, cooled in a chill train under cryogenic conditions, and then separated in distillation columns such as a demethanizer, a deethanizer, a depropanizer, a C2 splitter, a C3 splitter, and the like. To that end, at least three (3) large compressors: a process-gas compressor, a propylene refrigeration compressor and an ethylene refrigeration compressor may be used. In a modern, world scale olefins plant, the combined shaft power of these compressors can exceed 100 MW (134,000 hp). This very high shaft power demand is a characteristic of olefins production plants, and differentiates them from most other petrochemical facilities. Typically the large compressors are driven by steam-turbines. The majority of the steam can be generated by the steam produced from cooling the steam cracker effluent as described above. If necessary, boilers are used to make-up the required steam volumes.

Because of the large shaft power requirements of the major compressors, for efficient olefin production it is important that the steam-power cycle be as efficient as possible. A multi-pressure-level steam system with the highest steam pressure level being nominally 100 BarG (1500 psig, or 10.3 MPaG) or higher may be advantageously used. This Super-HPS may be superheated in order to maximize the specific power output (kW power/kg steam consumed) of the turbines. In addition to the large compressor steam turbines, smaller turbine drivers may be used for several services within the olefins production plant (e.g.: cooling water pumps, quench water pumps, boiler-feed water pumps, air compressors, etc.). These turbines can receive HPS, MPS, or LPS streams. In addition, process heating duties existing in the olefins recovery train may be satisfied by condensing one or more HPS, MPS, or LPS stream(s).

In certain embodiments, a single stage of steam turbine is used in step (D). In certain other embodiments, multiple cascading stages of steam turbines may be used, where an expanded steam stream produced from an upstream stage, preferably an HPS stream or an MPS stream, is supplied to a downstream steam turbine, expanded therein to produce a lower pressure steam stream and additional shaft power. The shaft power produced by the one or more steam turbines in step (D) can be used to perform mechanical work such as: driving a generator to produce electrical power transmissible to local and/or distant electrical equipment; driving a compressor or pump located in an industrial plant, such as a process gas compressor, a propylene refrigeration compressor, an ethylene refrigeration compressor, an air compressor, and/or various pumps located in an olefins production plant. The expanded steam stream may be supplied to a steam header with the suitable pressure rating located in any industrial plant such as an olefins production plant. In certain embodiments, the SH-HPS stream obtained in step (C) may be supplied to an olefins production plant at a pressure no less than the maximal pressure required for the operation of any steam turbine having a power rating of at least 1 megawatt (1 MW, or ≥5 MW, or ≥10 MW, or ≥20 MW) in the olefins production plant. In certain preferred embodiments, the SH-HPS stream obtained from step (C) (which may or may not be a Super-HPS stream) may be supplied to a first stage steam turbine that drives a process gas compressor in an olefins production plant, and the expanded steam stream from the first stage steam turbine, which may be an SH-HPS stream or an MPS stream, may be supplied to a second stage steam turbine producing a second expanded steam stream and shaft power driving another process gas compressor, a propylene refrigeration compressor, an ethylene refrigeration compressor, an air compressor, and/or a pump in the olefins production plant. In another embodiment, the SH-HPS stream obtained from step (C) may be supplied to drive one or more process gas compressors, a propylene refrigeration compressor, and an ethylene refrigeration compressor, each producing an expanded steam stream having the same, similar, or different pressure. The expanded steam streams from the first stage and/or the second stage can then be used to provide process heat, or supplied to additional steam turbines, depending on their respective pressures. In addition, one or more of the steam turbines may exhaust a condensable steam stream fed to a condenser to produce a condensate water stream.

While the shaft power produced in step (D) may be used to drive an electricity generator in a power island, in preferred embodiments of this disclosure where the shaft power is used to drive compressors, pumps, and the like in an integrated olefins production plant, such power island can be eliminated or included at a smaller size, resulting in considerable reduction in capital and operational costs.

The cooled reformed stream obtained in step (B) of the reforming process as described above comprises $H_2$, CO, and steam. It can be used for producing syngas. By abating steam from the cooled reformed gas, one can obtain a first syngas comprising CO and $H_2$. Alternatively, one can further subject the cooled reformed stream in one or more stages of shift reactor to convert a portion of the CO and steam into $CO_2$ and $H_2$, followed by steam abatement to obtain a second syngas comprising CO, $H_2$, and $CO_2$. One may further recover the $CO_2$ from the second syngas to produce a third syngas consisting essentially of CO, $H_2$, and optional residual hydrocarbon, with various CO concentration. The first, second, and third syngases may be used for various applications, e.g., industrial heating, ammonia production, and the like. In a preferred embodiment, the third syngas may comprise CO at a very low concentration of, e.g., ≤10 mol %, ≤8 mol %, ≤5 mol %, ≤3 mol %, ≤1 mol %, ≤0.5 mol %, ≤0.1 mol %, based on the total moles of molecules in the third syngas, in which case the third syngas is an $H_2$-rich gas. Such $H_2$-rich gas can be advantageously used as a fuel gas, the combustion of which can produce a flue gas having low $CO_2$ emission.

III. The Process for Producing a $H_2$-Rich Fuel Gas

A particularly advantageous process for producing $H_2$-rich fuel gas comprises: (I) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam; (II) cooling the reformed stream by using a waste heat recovery unit ("WHRU") to produce a cooled reformed stream and to generate a high-pressure steam ("HPS") stream; (III) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reformed stream; (IV) cooling the first shifted stream to obtain a cooled first shifted stream; (V) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream; (VI) abating steam present in the second shifted stream to produce a crude gas mixture stream comprising $CO_2$ and $H_2$; (VII) recovering at least a portion of the $CO_2$ present in the crude gas mixture stream to produce a $CO_2$ stream and a $H_2$-rich stream, wherein the $H_2$-rich stream comprises $H_2$ at a concentration of at least 80 mol %, based on the total moles of molecules in the $H_2$-rich stream; and (VIII) combusting a portion of the $H_2$-rich stream in the presence of an oxidant to generate thermal energy and to produce a flue gas stream.

Steps (I) and (II) may be identical with steps (A) and (B) of the syngas producing process described above in Section II above.

In step (III) of the process, the cooled reformed stream contacts a first shifting catalyst in a first shift reactor under a first set of shifting conditions to produce a first shifted stream exiting the first shift reactor. The first set of shifting conditions includes the presence of a first shift catalyst. Any suitable shift catalyst known to one skilled in the art may be used. The forward reaction of the following preferentially occur in the first shift reactor:

(R-2)

As such, the first shifted stream has a lower CO concentration and a higher $CO_2$ concentration than the cooled reformed stream. The forward reaction of (R-2) is exothermic, resulting in the first shifted stream having a temperature higher than the cooled reformed stream exiting the first shift reactor. The first shifted stream exiting the first shift reactor can have a temperature from, e.g., 335° C., 340° C., 350° C., 360° C., to 370° C., 380° C., 400° C., 420° C., to 440° C., 450° C., 460° C., 480° C., or even 500° C. The first shifted stream can have an absolute pressure substantially the same as the cooled reformed stream.

While a single stage of shift reactor may convert sufficient amount of CO in the cooled reformed stream to $CO_2$ resulting in a low CO concentration in the first shifted stream, it is preferable to include at least two stages of shift reactors in the processes of this disclosure to achieve a high level of conversion of CO to $CO_2$, and eventually to produce a $H_2$-rich fuel gas stream with low CO concentration. It is further preferred that a subsequent stage, such as the second shift reactor downstream of the first shift reactor is operated at a temperature lower than the first shift reactor, whereby additional amount of CO in the first shifted stream is further converted into $CO_2$ and additional amount of $H_2$ is produced. To that end, the first shifted stream is preferably first cooled down in step (IV) to produce a cooled first shifted stream. Such cooling can be effected by one or more heat exchangers using one or more cooling streams having a temperature lower than the first shifted stream. In one preferred embodiment, the first shifted stream can be cooled by the hydrocarbon stream or a split stream thereof to be fed into the syngas producing unit. Alternatively or additionally, the first shifted stream can be cooled by a boiler water feed stream to produce a heated boiler water stream, a steam stream, and/or a water/steam mixture stream. The thus heated boiler water stream can be heated in a boiler to produce steam at various pressure. The thus heated boiler water stream or steam stream can be further heated by another process stream in another heat exchanger to produce steam. In one preferred embodiment, the heated boiler water stream and/or steam stream can be fed into the steam drum of the WHRU extracting heat from the reformed stream as described above, where it is further heated to produce the HPS stream. The cooled first shifted stream can have a temperature from, e.g., 150° C., 160° C., 170° C., 180° C., 190° C., 200° C., to 210° C., 220° C., 230° C., 240° C., or even 250° C., and a pressure substantially the same as the first shifted stream.

The cooled first shifted stream is then subjected to a low-temperature shifting in a second shift reactor under a second set of shifting conditions to produce a second shifted stream. The first set of shifting conditions includes the presence of a second shift catalyst, which may be the same or different from the first shift catalyst. Any suitable shift catalyst known to one skilled in the art may be used. The forward reaction of the following preferentially occur in the first shift reactor:

(R-3)

As such, the second shifted stream has a lower CO concentration and a higher $CO_2$ concentration than the cooled first shifted stream. The forward reaction of (R-3) is exothermic, resulting in the second shifted stream having a temperature higher than the cooled first shifted stream entering the second shift reactor. The second shifted stream exiting the first shift reactor can have a temperature from, e.g., e.g., 150° C., 160° C., 170° C., 180° C., 190° C., 200° C., to 210° C., 220° C., 230° C., 240° C., 250° C., to 260° C., 270° C., 280° C., 290° C., or even 300° C. The second shifted stream can have an absolute pressure substantially the same as the cooled first shifted stream.

The second shifted stream comprises $H_2$, $CO_2$, CO, steam, and optionally $CH_4$. In step (VI), steam is then abated from it by cooling and separation. Similar to step (IV) of cooling the first shifted stream, such cooling of the second shifted stream can be effected by one or more heat exchangers using one or more cooling streams having a temperature lower than the second shifted stream. In one preferred embodiment, the second shifted stream can be cooled by the hydrocarbon stream or a split stream thereof to be fed into the syngas producing unit. Alternatively or additionally, the first shifted stream can be cooled by a boiler water feed stream to produce a heated boiler water stream, a steam stream, and/or a water/steam mixture stream. The thus heated boiler water stream can be heated in a boiler to produce steam at various pressure. The thus heated boiler water stream or steam stream, can be further heated by another process stream in another heat exchanger to produce steam. In one preferred embodiment, the heated boiler water stream and/or steam stream can be fed into the steam drum of the WHRU extracting heat from the reformed stream as described above, where it is further heated to produce the HPS stream. The cooled second shifted stream can preferably comprise water condensate, which can be separated to produce a crude gas mixture stream comprising steam at a significantly lower concentration than the second shifted stream exiting the second shift reactor.

The crude gas mixture stream thus consists essentially of $CO_2$, $H_2$, optionally $CH_4$ at various amounts, and steam and CO as minor components. The crude gas mixture stream can have an absolute pressure from, e.g., 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa In step (VII), one can recover a portion of the $CO_2$ therein to produce a $CO_2$ stream and a $H_2$-rich stream. Any suitable $CO_2$ recovery process known to one skilled in the art may be used in step (VII), including but not limited to: (i) amine absorption and regeneration process; (ii) a cryogenic $CO_2$ separation process; (iii) a membrane separation process; (iv) a physical absorption and regeneration process; and (iv) any combination any of (i), (ii), and (iii) above. In a preferred embodiment, an amine absorption and regeneration process may be used. Due to the elevated pressure of the crude gas mixture stream, the size of the $CO_2$ recovery equipment can be much smaller than otherwise required to recover $CO_2$ from a gas mixture at atmospheric pressure.

The $CO_2$ stream preferably comprises $CO_2$ at a molar concentration of from, e.g., 90%, 91%, 92%, 93%, 94%, to 95%, 96%, 97%, 98%, or even 99%, based on the total moles of molecules in the $CO_2$ stream. The $CO_2$ stream can comprise at least one and preferably all of, on a molar basis: (i) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of CO; (ii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, 5.0%, 5.5%, or even 6.0% of $H_2O$; and (iii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of $CH_4$. The $CO_2$ stream can have an absolute pressure from, e.g., 200 kPa, 300 kPa, 400 kPa, 500 kPa, 600 kPa, 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa, depending on the $CO_2$ recovery process and equipment used. In a preferred embodiment, where an amine absorption/regeneration $CO_2$ recovery unit is utilized, the $CO_2$ may have an absolute pressure from e.g., 200 kPa, 250 kPa, 300 kPa, 350 kPa, to 400 kPa, 450 kPa, 500 kPa, 550 kPa, 560 kPa, 570 kPa, 580 kPa, 590 kPa, or even 600 kPa. In such embodiments where an amine $CO_2$ separation unit is utilized, the heat needed in the $CO_2$/amine separation column may be advantageously provided at least partly, preferably primarily, preferably entirely by the exhaust steam stream having a pressure from 200 kPa to 1,050 kPa produced from the extraction turbine and/or back-pressure turbine as described above. The $CO_2$ stream can be compressed, liquefied, conducted away, stored, sequestered, or utilized in any suitable applications known to one skilled in the art. In one embodiment, the $CO_2$ stream, upon optional compression, can be conducted away in a $CO_2$ pipeline. In another embodiment, the $CO_2$ stream, upon optional compression and/or liquefaction, can be injected and stored in a geological formation. In yet another embodiment, the $CO_2$ stream, upon optional compression and/or liquefaction, can be used in extracting hydrocarbons present in a geological formation. Another exemplary use of the $CO_2$ stream is in food applications.

The $H_2$-rich stream can have an absolute pressure from, e.g., 700 kPa, 800 kPa, 800 kPa, 900 kPa, 1,000 kPa, to 1,500 kPa, 2,000 kPa, 2,500 kPa, 3,000 kPa, to 3,500 kPa, 4,000 kPa, 4,500 kPa, or even 5,000 kPa. The $H_2$-rich stream preferably comprises $H_2$ at a molar concentration of from, e.g., 80%, 81%, 82%, 83%, 84%, 85%, to 86%, 87%, 88%, 89%, 90%, to 91%, 92%, 93%, 94%, 95%, to 96%, 97%, or even 98%, based on the total moles of molecules in the $H_2$-rich stream. The $H_2$-rich stream can comprise at least one and preferably all of, on a molar basis: (i) e.g., from 0.1%, 0.2%, 0.3%, 0.4%, 0.5%, 0.6%, 0.7%, 0.8%, 0.9%, to 1.0%, 1.5%, 2.0%, 2.5%, or even 3.0%, of CO; (ii) e.g., from 0.1%, 0.2%, 0.3%, 0.4%, 0.5%, to 0.6%, 0.7%, 0.8%, 0.9%, or even 1.0%, of $CO_2$; and (iii) e.g., from 0.1%, 0.2%, 0.3%, 0.4%, 0.5%, 0.6%, 0.7%, 0.8%, 0.9%, to 1.0%, 1.5%, 2.0%, 2.5%, 3.0%, 3.5%, 4.5%, or even 5.0% of $CH_4$. One specific example of a $H_2$-rich stream that may be produced from the process of this disclosure has the following molar composition: 0.25% of $CO_2$; 1.75% of CO; 93.87% of $H_2$; 0.23% of $N_2$; 3.63% of $CH_4$; and 0.29% of $H_2O$.

Where an even higher purity $H_2$ stream is desired, a portion of the $H_2$-rich stream can be further purified by using processes and technologies known to one skilled in the art, e.g., pressure-swing-separation.

Preferably, however, the $H_2$-rich stream, notwithstanding the optional low concentrations of CO, $CO_2$, and $CH_4$, is used as a fuel gas stream without further purification to provide heating in step (VIII) of the process in, e.g., industrial applications. Due to the low combined concentrations of CO, $CO_2$, and $CH_4$ therein, the flue gas stream produced from combusting the $H_2$-rich stream can comprise $CO_2$ at a very low concentration, resulting in low $CO_2$ emission to the atmosphere. Thus, the flue gas stream can comprise $CO_2$ at a molar concentration from, e.g., 0.01%, 0.05%, to 0.1%, 0.2%, 0.3%, 0.4%, 0.5%, 0.6%, 0.7%, 0.8%, 0.9%, to 1%, 2%, 3%, 4%, 5%, 6%, 7%, 8%, 9%, 10%, to 11%, 12%, 13%, 14%, 15%, 16%, 17%, 18%, 19%, or 20%, preferably ≤10%, preferably ≤5%, preferably ≤3%, based on the total moles of $CO_2$ and $H_2O$ in the flue gas stream. The combustion may be in the presence of, e.g., air, $O_2$-enhanced air, high-purity $O_2$, and the like, depending on the specific application.

For use as a fuel gas stream, the $H_2$-rich stream may preferably has an absolute pressure of ≤1,135 kPa (150 psig), preferably ≤790 kPa (100 psig). To achieve such low pressure of the $H_2$-rich stream, it is feasible to design a syngas producing unit upstream comprising an SMR and/or an ATR operating under syngas producing conditions including a relatively low pressure, e.g., an absolute pressure of ≤2,169 kPa (300 psig), preferably ≤1,825 kPa (250 psig). As mentioned above, a lower pressure in the reforming reactor results in a higher $CH_4$ conversion in the reforming reactor, and hence a low residual $CH_4$ concentration in the $H_2$-rich stream.

Preferably, the $H_2$-rich stream is supplied to at least one, preferably a majority, preferably all, of the combustion devices used in the process/system for producing the $H_2$-rich stream. Thus, where the syngas producing unit comprises a pre-reformer including a furnace heated by one or more burners combusting a fuel gas, preferably a portion of the $H_2$-rich stream is supplied as at least a portion, preferably a majority, preferably the entirety, of the fuel gas to such burners. Where the syngas producing unit includes an SMR comprising one or more SMR burners combusting a SMR fuel, it is highly desirable to supply a portion of the $H_2$-rich stream as at least a portion, preferably a majority, preferably the entirety, of the SMR fuel. Where the $H_2$-rich stream production process/system uses an additional boiler or auxiliary furnace combusting a fuel gas, it is desirable supply a portion of the $H_2$-rich stream as at least a portion, preferably a majority, preferably the entirety, of the fuel gas. By combusting the $H_2$-rich stream and capturing the $CO_2$ stream, the $H_2$-rich stream production process/system of this disclosure can reach a very low overall level of $CO_2$ emission to the atmosphere.

Compared to existing syngas and/or $H_2$-rich fuel gas producing processes, especially those combusting a hydrocarbon-containing fuel, the $H_2$-rich fuel gas production process as described above has at least one of the following advantages: (i) lower capital investment and production cost due to, e.g., an absence of a PSA unit, a small-size $CO_2$ recovery unit, and operating the syngas producing unit, the first shift reactor, and the second shift gas reactor under relatively low pressure; and (ii) lower $CO_2$ emission if the $CO_2$ stream is captured, stored, sequestered, and/or utilized.

This disclosure is further illustrated by the exemplary but non-limiting embodiments shown in the drawings, which are described below. In the drawings, the same reference numeral may have similar meaning. In the drawings illustrating an inventive process/system, where multiple initially separate streams are shown to form a joint stream supplied to a next step or device, it should be understood to further include, where appropriate, an alternative where at least one of such multiple separate streams is supplied to the next step or device separately. Where multiple initially separate streams having similar compositions and/or use applications (steam streams generated from differing devices) are shown to form a joint stream supplied to multiple next steps or devices, it should be understood to include, where appropriate, alternatives where at least one of the separate streams and the joint stream is supplied to at least one of the multiple next steps or devices. Thus, where a steam stream X and a steam stream Y, initially separate and generated from differing devices but with similar applications, are shown to form a joint stream Z supplied to two separate turbines A and B, it should be understood to include alternatives where at least one of X, Y, and Z is supplied to at least one of A and B, including but not limited to the following: (i) only stream Z is supplied to A and B; (ii) both of X and Y are supplied, separately, to at least one of A and B; (iii) both of X and Z are supplied, separately, to at least one of A and B; (iv) both of Y and Z are supplied, separately, to at least one of A and B; and (v) only one of X and Y is supplied to at least one of A and B. The drawings are only for the purpose of illustrating certain embodiments of this disclosure, and one skilled in the art appreciates that alternatives thereof may fall within the scope of this disclosure.

FIG. 1 (Comparative)

FIG. 1 schematically illustrates the steam supply/consumption system 101 of an olefins production plant including one or more steam cracker furnaces. One or more Super-HPS stream(s) 107 are produced from one or more steam cracker furnace(s) 103. One or more Super-HPS stream(s) 109, if needed, are produced from one or more auxiliary steam boiler(s) 105. Streams 107 and 109 may be optionally combined, as shown, at a Super-HPS header, from which the Super-HPS stream can be distributed to equipment consuming steam. As shown in FIG. 1, one or more Super-HPS stream(s) 113, one or more Super-HPS stream(s) 115, and one or more Super-HPS stream(s) 117 are supplied to one or more steam turbine(s) 119, one or more steam turbine(s) 129, and one or more steam turbine(s) 141, respectively. Steam turbine(s) 119 can drive one or more process gas compressor(s). Steam turbine(s) 129 can drive one or more propylene refrigeration compressors. Steam turbine(s) 141 can drive one or more ethylene refrigeration compressors. Surplus Super-HPS steam may be supplied to other facilities/equipment/process 111 for consumption. From steam turbine(s) 119, one or more HPS stream(s) 121 may be exhausted. Stream(s) 121 can be used to provide process heat, e.g., to a stream 125 in the olefins production plant or other facilities, or supplied to a steam turbine 125 receiving an HPS stream and exhausting a MPS stream, or supplied to a steam turbine 125 receiving an HPS stream and exhausting an LPS stream, to produce additional mechanical work which can be used to drive another compressor, pumps, and the like. From steam turbine(s) 119, one or more condensable stream(s) 123 may be exhausted, which can be condensed at condenser(s) 127 to produced one or more condensed water stream(s) 128. From steam turbine(s) 129, one or more MPS stream(s) 131 may be exhausted. Stream(s) 131 can be used to provide process heat, e.g., to a stream 133 in the olefins production plant or other facilities, or supplied to a steam turbine 133 receiving a MPS stream and exhausting an LPS stream, to produce additional mechanical work which can be used to drive another compressor, pumps, and the like. From steam turbine(s) 129, one or more condensable stream(s) 135 may be exhausted, which are then condensed at condenser(s) 137 to produced one or more condensed water stream(s) 139. From steam turbine(s) 141, one or more LPS stream(s) 143 may be exhausted. Stream(s) 143 can be used to provide process heat, e.g., to a stream 145 in the olefins production plant or other facilities. From steam turbine(s) 141, one or more condensable stream(s) 147 may be exhausted, which are then condensed at condenser(s) 149 to produced one or more condensed water stream(s) 151. Condensed water streams 128, 139, and 151 may be combined and processed together at location 353, which can be subsequently reused in the facility.

FIG. 2

Figure 2:
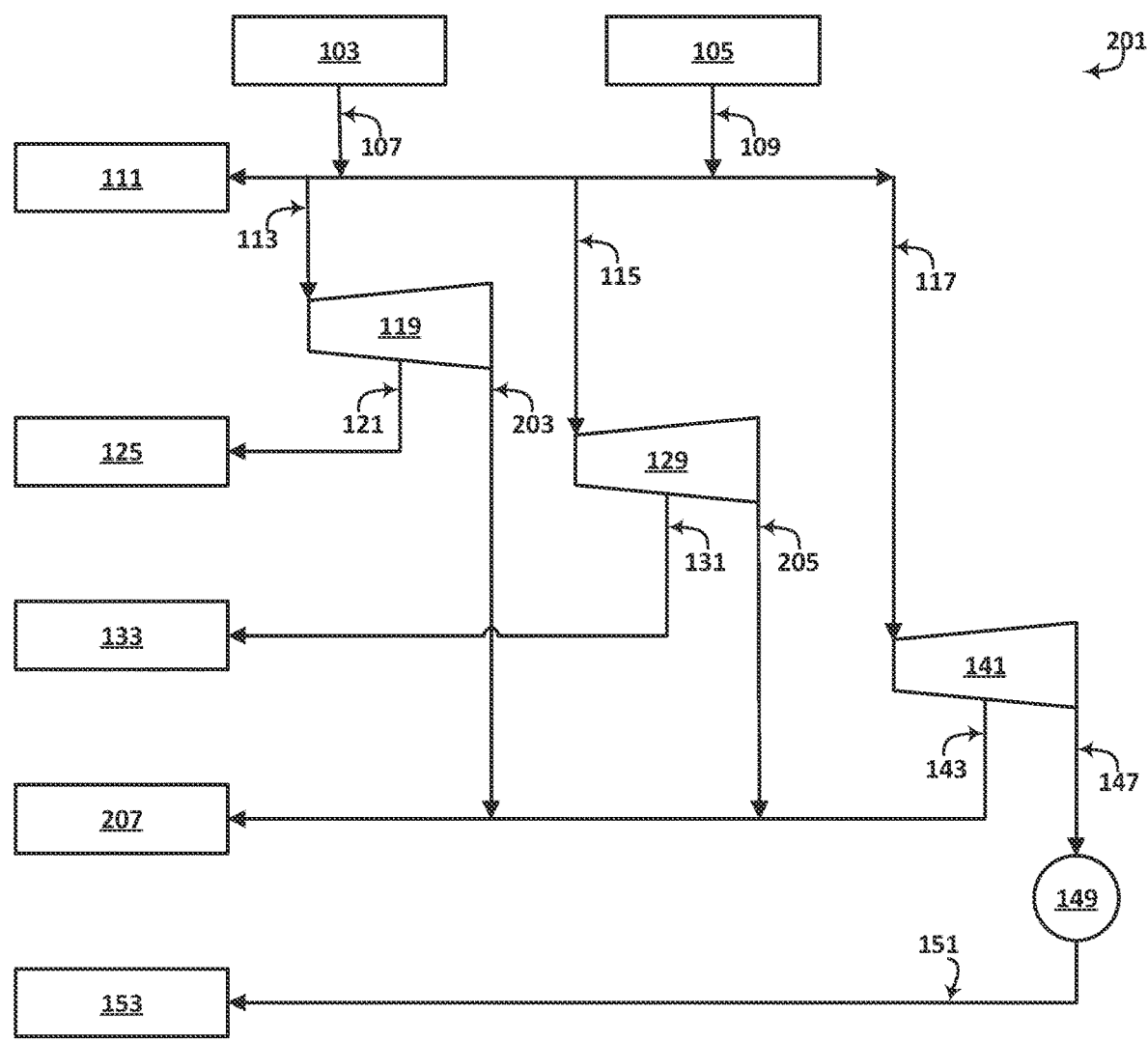
FIG. 2 schematically illustrates an exemplary steam supply/consumption system integrating the olefins production plant shown in FIG. 1 and an amine $CO_2$ recovery process.

FIG. 2 schematically illustrates an exemplary steam supply/consumption system 201 integrating the olefins production plant shown in FIG. 1 and an amine $CO_2$ separation process. As shown, one or more Super-HPS stream(s) 107 are produced from one or more steam cracker furnace(s) 103. One or more Super-HPS stream(s) 109, if needed, are produced from one or more auxiliary steam boiler(s) 105. Streams 107 and 109 may be optionally combined, as shown, at a Super-HPS header, from which the Super-HPS stream can be distributed to equipment consuming steam. As shown in FIG. 2, one or more Super-HPS stream(s) 113, one or more Super-HPS stream(s) 115, and one or more Super-HPS stream(s) 117 are supplied to one or more steam turbine(s) 119, one or more steam turbine(s) 129, and one or more steam turbine(s) 141, respectively. Surplus Super-HPS steam may be supplied to other facilities/equipment/process 111 for consumption. Steam turbine(s) 119 can drive one or more process gas compressor(s). Steam turbine(s) 129 can drive one or more propylene refrigeration compressors. Steam turbine(s) 141 can drive one or more ethylene refrigeration compressors. From steam turbine(s) 119, one or more HPS stream(s) 121 may be exhausted. Stream(s) 121 can be used to provide process heat, e.g., to a stream 125 in the olefins production plant or other facilities, or supplied to a steam turbine 125 receiving an HPS stream and exhausting a MPS stream, or supplied to a steam turbine 125 receiving an HPS stream and exhausting an LPS stream, to produce additional mechanical work which can be used to drive another process gas compressor, pumps, and the like. From steam turbine(s) 119, instead of one or more condensable stream(s) 123 shown in FIG. 1, one or more LPS stream(s) 203 may be exhausted. From steam turbine(s) 129, one or more MPS stream(s) 131 may be exhausted. Stream(s) 131 can be used to provide process heat, e.g., to a stream 133 in the olefins production plant or other facilities, or supplied to a steam turbine 133 receiving a MPS stream and exhausting an LPS stream, to produce additional mechanical work which can be used to drive another compressor, pumps, and the like. From steam turbine(s) 129, instead of one or more condensable stream(s) 135, one or more LPS stream(s) 205 may be exhausted. From steam turbine(s) 141, one or more LPS stream(s) 143 may be exhausted. The LPS streams thus exhausted from various steam turbines, such as stream(s) 203, 205, and 143 may be combined and used to provide process heat, e.g., to a stream 145 in the olefins production plant or other facilities, or to the amine regenerator of an amine $CO_2$ separation process 207. From steam turbine(s) 141, one or more condensable stream(s) 147 may be exhausted, which are then condensed at condenser(s) 149 to produced one or more condensed water stream(s) 151, which can be processed at location 153, and subsequently reused in the facility.

EXAMPLES

Example 1 (Comparative)

Figure 3:
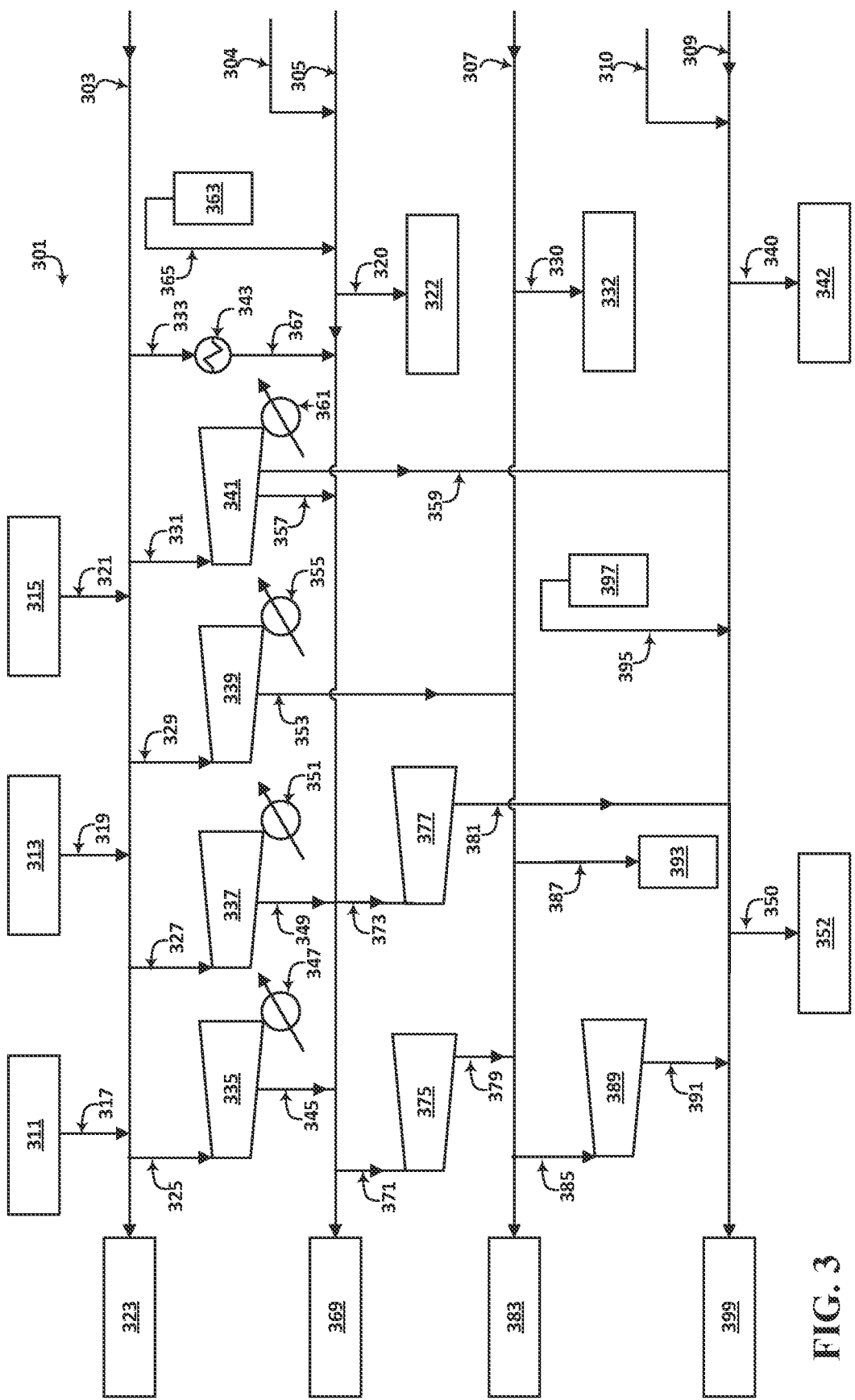
FIG. 3 schematically illustrates a steam supply/consumption configuration of a comparative olefins production plant including multiple steam crackers.

FIG. 3 schematically illustrates a steam supply/consumption configuration 301 of a comparative olefins production plant including multiple steam crackers. As shown, the plant supplies superheated steams through lines 303, 305, 307, and 309 at the following temperature and pressures, respectively: 930° F. and 1500 psig (Super-HPS); 700° F. and 660 psig (HPS); 570° F. and 225 psig (MPS); and 450° F. and 50 psig (LPS). 1560 kilo-pounds/hour ("klb/hr") of Super-HPS in stream 317 produced by a gas turbine generator unit 311, 340 klb/hr of Super-HPS in stream 319 produced by the multiple steam cracker furnaces 313, and 596 klb/hr of Super-HPS in stream 321 produced by boilers 315 are supplied to line 303. From line 303, the Super-HPS streams 325, 327, 329, 331, and 333 are supplied to steam turbines 335, 337, 339, 341, and heat exchanger 343 at the following flow rates, respectively: 879 klb/hr; 710 klb/hr, 745 klb/hr, 301 klb/hr, and 3 klb/hr. From line 303, 58 klb/hr of the Super-HPS is exported to other users 323. Steam streams entering steam turbines are expanded therein to produce one or more extracted streams and shaft power. The shaft power can be used to drive various equipment in the olefins production plant, such as process gas compressors, propylene refrigeration compressors, and pumps, and the like.

Line 305 receives an imported HPS stream 304 at 30 klb/hr, an HPS stream 345 extracted from steam turbine 335 at 700 klb/hr, an HPS stream 349 extracted from steam turbine 337 at 585 klb/hr, an HPS stream 357 extracted from steam turbine 341 at 100 klb/hr, an HPS stream 367 from heat exchanger 343 at 3 klb/hr, and an HPS stream 365 from a steam drum 363 at 10 klb/hr. All four steam turbines 335, 337, 339, and 341 also produce a condensable steam stream condensed at a surface condenser 347, 351, 355, and 361, respectively, at the following flow rates, respectively: 179 klb/hr, 124 klb/hr, 79 klb/hr, and 149 klb/hr. From line 305, HPS streams 371, 373, and 320 are supplied to steam turbines 375 and 377 and other on-site users 322 at the following flow rates, respectively: 540 klb/hr, 127 klb/hr, and 68 klb/hr. From line 305, 695 klb/hr of HPS is exported to other users 369.

Line 307 receives an MPS stream 379 extracted from steam turbine 375 at 540 klb/hr, and an MPS stream 357 extracted from steam turbine 338 at 667 klb/hr. Steam turbine 375 does not produce a condensable stream supplied to a surface condenser. From line 307, MPS streams 385, 387 and 330 are supplied to steam turbine 389, on-site users 393, and on-site users 332 at the following flow rates, respectively: 324 klb/hr, 206 klb/hr, and 306 klb/hr. From line 307, 330 klb/hr of MPS is exported to other users 383.

Line 309 receives an imported LPS stream 310 at a flow rate of 12 klb/hr, an LPS stream 379 extracted from steam turbine 389 at 324 klb/hr, an LPS stream 381 extracted from steam turbine 377 at 127 klb/hr, and an LPS stream 395 extracted from steam drum 397 at a flow rate of 70 klb/hr. Neither of steam turbines 389 and 377 produces a condensable stream supplied to a surface condenser. From line 309, LPS streams 340 and 350 are supplied to on-site users 342 and 352, respectively, at the following flow rates, respectively: 261 klb/hr, and 207 klb/hr.

In this Example 1, from the four major steam-turbines 335, 337, 339, and 341, a total of 530 klb/hr of steam is condensed, giving a total condenser duty of 520 MBtu/hr (152 MW).

Example 2 (Inventive)

Figure 4:
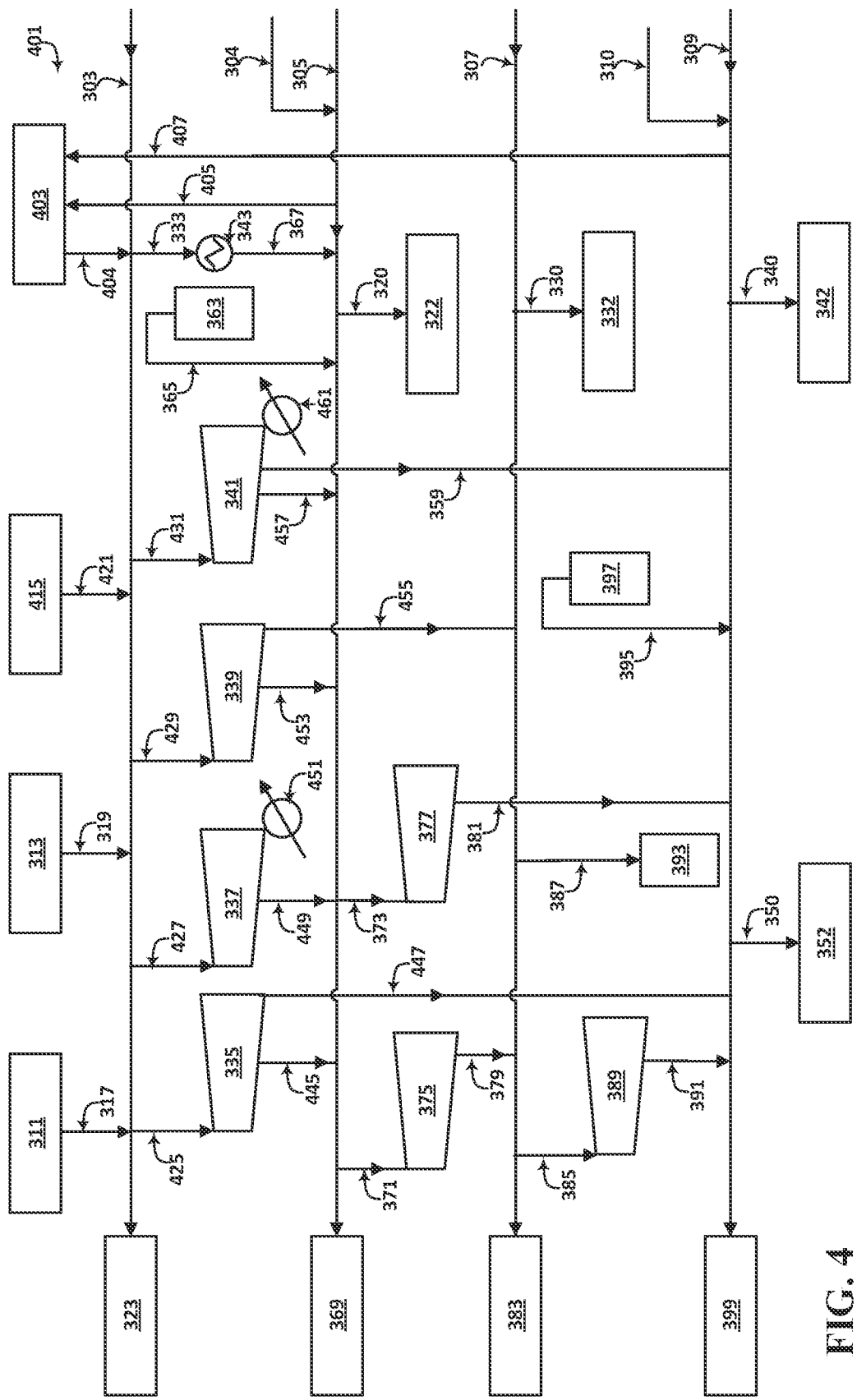
FIG. 4 schematically illustrates an inventive steam supply/consumption configuration of an olefins production plant modified from the plant of FIG. 3 and steam-integrated with an SMR.

FIG. 4 schematically illustrates an inventive steam supply/consumption configuration 401 of an olefins production plant modified from the plant of FIG. 3 and steam-integrated with an SMR. As shown in FIG. 4, the plant supplies superheated steams through lines 303, 305, 307, and 309 at the following temperature and pressures, respectively: 930° F. and 1500 psig (Super-HPS); 700° F. and 660 psig (HPS); 570° F. and 225 psig (MPS); and 450° F. and 50 psig (LPS), the same as in FIG. 3. 1560 klb/hr of Super-HPS in stream 317 produced by a gas turbine generator unit 311, 540 klb/hr of Super-HPS in stream 319 produced by the multiple steam cracker furnaces 313, 262 klb/hr of Super-HPS in stream 421 produced by boilers 415, and 905 klb/hr of Super-HPS in stream 404 produced by an SMR 403 are supplied to line 303. From line 303, the Super-HPS streams 425, 427, 279, 431, and 333 are supplied to steam turbines 335, 337, 339, 341, and heat exchanger 343 at the following rates, respectively: 951 klb/hr; 808 klb/hr, 1073 klb/hr, 373 klb/hr, and 3 klb/hr. From line 303, 58 klb/hr of the Super-HPS is exported to other users 323.

Line 305 receives an imported HPS stream 304 at 30 klb/hr, an HPS stream 445 extracted from steam turbine 335 at 630 klb/hr, an HPS stream 449 extracted from steam turbine 337 at 700 klb/hr, an HPS stream 453 extracted from steam turbine 339 at 407 klb/hr, an HPS stream 457 extracted from steam turbine 341 at 149 klb/hr, an HPS stream 367 from heat exchanger 343 at 3 klb/hr, and an HPS stream 365 from a steam drum 363 at 10 klb/hr. Only steam turbines 337 and 341 also produce a condensable steam stream condensed at a surface condenser 351 and 461, respectively, at the following flow rates, respectively: 108 klb/hr and 89 klb/hr. From line 305, HPS streams 371 and 373 are supplied to steam turbines 375 and 377 and other on-site users 322 at the following flow rates, respectively: 540 klb/hr, 127 klb/hr, and 68 klb/hr. From line 305, 595 klb/hr of HPS is exported to other users 369. Additionally, from line 305, an HPS stream 405 at a flow rate of 499 klb/hr is supplied to SMR 403.

Line 307 receives an MPS stream 379 extracted from steam turbine 375 at 540 klb/hr, and an MPS stream 357 extracted from steam turbine 338 at 567 klb/hr. Steam turbine 375 does not produce a condensable stream supplied to a surface condenser. From line 307, MPS streams 385, 387 and 330 are supplied to steam turbine 389, on-site users 393, and on-site users 332 at the following flow rates, respectively: 324 klb/hr, 206 klb/hr, and 306 klb/hr. From line 307, 360 klb/hr of MPS is exported to other users 383.

Line 309 receives an imported LPS stream 310 at a flow rate of 12 klb/hr, an LPS stream 379 extracted from steam turbine 389 at 324 klb/hr, an LPS stream 381 extracted from steam turbine 377 at 127 klb/hr, and an LPS stream 395 extracted from steam drum 397 at a flow rate of 70 klb/hr. Neither of steam turbines 389 and 377 produces a condensable stream supplied to a surface condenser. From line 309, LPS streams 340 and 350 are supplied to on-site users 342 and 352, respectively, at the following flow rates, respectively: 261 klb/hr, and 207 klb/hr. Additionally, from line 309, an LPS stream 407 at a flow rate of 487 klb/hr is supplied to the amine regenerator of the amine $CO_2$ capture unit associated with SMR 403.

Thus, in this inventive Example 2, compared to Example 1, the number of condensing turbines is reduced from 4 to 2, the total duty of surface condensers is reduced by 96.6 MW, corresponding to a reduction of thermal energy released to the atmosphere of 96.6 MW. The ratio of the reduction of thermal energy released to the atmosphere to the total LP steam made available to the amine unit is 68%, a highly significant percentage. See TABLE I below for operation parameters.

TABLE I

|  |  | Example 1 Comparative | Example 2 Inventive |
|---|---|---|---|
| Total Power of Turbines 335, 337, 339, and 341 | MW | 128.9 | 128.9 |
| Number of Condensing Turbines |  | 4 | 2 |
| Total Super-HPS Steam to Turbines | tph | 1,195 | 1,454 |
| Total Duty of Surface Condensers | MW | 152.3 | 55.7 |
| Reduction of Energy Loss to Atmosphere (A) | MW | — | 96.6 |
| LP Steam made available to Amine Unit | tph | — | 220.9 |
| LP Steam made available to Amine Unit (B) | MW | — | 141.2 |
| Ratio: A/B | % |  | 68 |

This disclosure can include the following non-limiting embodiments:

A1. A process comprising:
(i) obtaining an exhaust steam stream having an absolute pressure from 200 kPa to 1,050 kPa and shaft power from one or more extraction turbines and/or back-pressure turbines, wherein the shaft power drives a device located in a hydrocarbon processing plant;
(ii) providing a gas mixture stream comprising $CO_2$;
(iii) feeding the gas mixture stream and a lean-amine stream comprising an amine into an absorption column;
(iv) obtaining a $CO_2$-rich amine stream and a $CO_2$-depleted residual gas stream from the absorption column;
(v) feeding at least a portion of the $CO_2$-rich amine stream into a separation column;
(vi) heating the at least a portion of the $CO_2$-rich amine stream in the separation column using the exhaust steam stream to produce a stream rich in $CO_2$ and a stream rich in the amine; and
(vii) recycling at least a portion of the bottoms stream to the absorption column as at least a portion of the lean-amine stream.

A2. The process of A1, wherein the exhaust steam stream has an absolute pressure no higher than 450 kPa.

A3. The process of A1 or A2, wherein the gas mixture stream comprises $H_2$, CO, and $CO_2$.

A4. The process of any of A1 to A3, wherein the one or more extraction turbine(s) and/or back-pressure turbine(s) is located in an olefins production plant including a steam cracker, and the one or more extraction turbine(s) back-pressure turbine drives a compressor located in the olefins production plant.

A5. The process of any of A1 to A4, wherein at least one of the one or more extraction turbine(s) and/or back-pressure turbine(s) comprises a back-pressure turbine.

A6. The process of A5, wherein all of the one or more extraction turbines and/or back-pressure turbines are back-pressure turbines.

A7. The process of A5, wherein:
the exhaust steam stream provides a quantity of energy to the at least a portion of the $CO_2$-rich amine stream in step (vi); and
at least 30% of the quantity of energy would have been lost to the atmosphere in a comparative process identical with the process except the back-pressure turbine is substituted by an extraction/condensing turbine with the identical power rating.

A8. The process of A8, wherein at least 50% of the quantity of energy would have been lost to the atmosphere in the comparative process.

A9. The process of A8, wherein at least 70% of the quantity of energy would have been lost to the atmosphere in the comparative process.

A10. The process of any of A1 to A9, wherein the gas mixture stream is produced by a syngas producing process comprising:
(A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;
(B) cooling the reformed stream by using a waste heat boiler ("WHB") to produce a cooled reformed stream and to generate a high-pressure steam ("HPS") stream;
(C) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the first cooled reforming reactor effluent stream; and
(D) obtaining the gas mixture stream from the first shifted stream.

A11. The process of A10, wherein step (D) comprises:
(D1) cooling the first shifted stream to obtain a cooled first shifted stream;
(D2) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream;
(D3) abating the steam present in the second shifted stream to produce the gas mixture stream comprising $CO_2$ and $H_2$.

A12. The process of A11 or A12, wherein the syngas producing unit comprises a steam-methane-reformer ("SMR"), and/or an autothermal reformer ("ATR").

A13. The process of A12, wherein:
the reforming reactor comprises a SMR; and
the SMR comprises: a plurality of SMR burners where a SMR fuel combusts to supply thermal energy to SMR; a radiant section heated by the thermal energy in which the hydrocarbon feed and steam reacts under the syngas producing conditions; a convection section heated by the thermal energy in which the hydrocarbon feed and steam are preheated before entering the radiant section.

A14. The process of A13, wherein the reformed stream has a temperature from 750 to 900° C.

A15. The process of A13 or A14, wherein the syngas producing process further comprises:
(E) heating the HPS stream generated in step (B) in the convection section of the SMR and/or an auxiliary furnace to obtain a super-heated HPS ("SH-HPS") stream having at least one of the following: a temperature from 350° C. to 550° C., and a pressure from 4,000 kPa to 14,000 kPa.

A16. The process of A12, wherein:
the reforming reactor comprises an ATR;
an $O_2$ stream is fed into the ATR;
the ATR comprises a reaction vessel into which the hydrocarbon feed, the steam feed, and the $O_2$ stream are supplied;
the reforming conditions comprises the presence of an ATR catalyst in the reaction vessel; and
the reformed stream has at least one of the following: a temperature from 800° C. to 1,100° C.; and an absolute pressure from 2,000 kPa to 5,000 kPa.

A17. The process of A16, further comprising:
(E') heating the HPS stream generated in step (B) in an auxiliary furnace to obtain a super-heated HPS ("SH-HPS") stream having at least one of the following: a temperature from 350° C. to 550° C., and a pressure from 4,000 kPa to 14,000 kPa.

A18. The process of any of A15 to A17, wherein a portion of the SH-HPS stream generated in step (E) or step (E') is supplied to the one or more extraction turbine(s) and/or back-pressure turbine(s) in step (i).

A19. The process of any of A10 to A17, further comprising:
(F1) expanding the at least a portion of the SH-HPS stream produced in step (E) and/or step (E') in a first stage steam turbine to produce shaft power and an intermediate steam stream;
and
(F2) expanding at least a portion of the intermediate steam stream in a second stage turbine to produce the exhaust steam stream, wherein the second stage turbine is an extraction turbine and/or a back-pressure turbine.

A20. The process of A19, wherein the first stage turbine and/or the second stage turbine is selected from: (i) one or more turbines driving one or more process-gas compressors located on the olefins production plant; (ii) one or more turbines driving one or more propylene refrigeration compressors located on the olefins production plant; and (iii) one or more turbines driving one or more ethylene refrigeration compressors located on the olefins production plant.

A21. The process of A19 or A20, wherein a portion of the SH-HPS stream generated in step (E) and/or step (E') is supplied to a turbine driving a pump located on the olefins production plant.

A22. A process comprising:
(i) obtaining an exhaust steam stream having an absolute pressure from 200 kPa to 1,050 kPa exhausted from one or more extraction turbine(s) and/or back-pressure turbine(s) located in an olefins production plant, wherein the extraction turbine(s) and/or back-pressure turbine(s) drives one or more of the following: a process-gas compressor; a refrigeration compressor; and combinations thereof;
(ii) providing a gas mixture stream comprising $CO_2$;
(iii) feeding the gas mixture stream and a lean-amine stream comprising an amine into an absorption column;
(iv) obtaining a $CO_2$-rich amine stream and a $CO_2$-depleted residual gas stream from the absorption column;
(v) feeding at least a portion of the $CO_2$-rich amine stream into a separation column;
(vi) heating the at least a portion of the $CO_2$-rich amine stream in the separation column using the exhaust steam stream to produce an overhead stream rich in $CO_2$ and a bottoms stream rich in the amine; and
(vii) recycling at least a portion of the bottoms stream to the absorption column as at least a portion of the lean-amine stream.

A23. The process of A22, wherein step (i) comprises:
(ia) providing a super-heated high-pressure steam (SH-HPS) stream;
(ib) expanding at least a portion of the SH-HPS stream in the at least one extraction turbine(s) and/or back-pressure turbine(s) to obtain the exhaust steam stream.

A24. The process of A22, wherein step (i) comprises:
(ia') providing a super-heated high-pressure steam (SH-HPS) stream;
(ib') expanding at least a portion of the SH-HPS stream in a first stage steam turbine to an intermediate steam stream; and
(ic') expanding the intermediate steam stream in a second stage turbine to obtain the exhaust steam stream, wherein the second stage turbine is an extraction turbine or a back-pressure turbine.

A25. The process of A23 or A24, wherein the gas mixture stream is produced by a syngas producing process comprising:
(A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;
(B) cooling the reformed stream by using a waste heat boiler ("WHB") to produce a cooled reformed stream and to generate a high-pressure steam ("HPS") stream;
(C) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the first cooled reforming reactor effluent stream;
(D) obtaining the gas mixture stream from the first shifted stream;
(E) cooling the first shifted stream to obtain a cooled first shifted stream;
(F) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream;

(G) abating the steam present in the second shifted stream to produce the gas mixture stream comprising $CO_2$ and $H_2$; the process further comprises:

(viii) heating the HPS stream generated in step (B) to obtain the SH-HPS stream, wherein the SH-HPS stream has at least one of the following: a temperature from 350° C. to 550° C., and a pressure from 4,000 kPa to 14,000 kPa.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process comprising:
   (i) obtaining an exhaust steam stream having an absolute pressure from 200 kPa to 1,050 kPa and shaft power from one or more extraction turbine(s) and/or back-pressure turbine(s), wherein the one or more extraction turbine(s) and/or back-pressure turbine(s) is located in an olefins production plant, and the shaft power drives a device located in the olefins production plant;
   (ii) providing a gas mixture stream comprising $CO_2$;
   (iii) feeding the gas mixture stream and a lean-amine stream comprising an amine into an absorption column;
   (iv) obtaining a $CO_2$-rich amine stream and a $CO_2$-depleted residual gas stream from the absorption column;
   (v) feeding at least a portion of the $CO_2$-rich amine stream into a separation column;
   (vi) heating the at least a portion of the $CO_2$-rich amine stream in the separation column using the exhaust steam stream to produce a stream rich in $CO_2$ and a stream rich in the amine; and
   (vii) recycling at least a portion of the stream rich in $CO_2$ to the absorption column as at least a portion of the lean-amine stream.

2. The process of claim 1, wherein the exhaust steam stream has an absolute pressure no higher than 450 kPa.

3. The process of claim 1, wherein the gas mixture stream comprises $H_2$, CO, and $CO_2$.

4. The process of claim 1, wherein the device driven by the one or more extraction turbine(s) and/or back-pressure turbine(s) is a compressor located in the olefins production plant.

5. The process of claim 1, wherein at least one of the one or more extraction turbine(s) and/or back-pressure turbine(s) comprises a back-pressure turbine.

6. The process of claim 5, wherein all of the one or more extraction turbines and/or back-pressure turbines are back-pressure turbines.

7. The process of claim 5, wherein:
   the exhaust steam stream provides a quantity of energy to the at least a portion of the $CO_2$-rich amine stream in step (vi); and
   at least 30% of the quantity of energy would have been lost to the atmosphere in a comparative process identical with the process except the back-pressure turbine is substituted by an extraction/condensing turbine with the identical power rating.

8. The process of claim 7, wherein at least 50% of the quantity of energy would have been lost to the atmosphere in the comparative process.

9. The process of claim 8, wherein at least 70% of the quantity of energy would have been lost to the atmosphere in the comparative process.

10. The process of claim 1, wherein the gas mixture stream is produced by a syngas producing process comprising:
    (A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;
    (B) cooling the reformed stream by using a waste heat boiler ("WHB") to produce a cooled reformed stream and to generate a high-pressure steam ("HPS") stream;
    (C) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the cooled reforming reactor effluent stream; and
    (D) obtaining the gas mixture stream from the first shifted stream.

11. The process of claim 10, wherein step (D) comprises:
    (D1) cooling the first shifted stream to obtain a cooled first shifted stream;
    (D2) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream;
    (D3) reducing an amount of steam present in the second shifted stream to produce the gas mixture stream comprising $CO_2$ and $H_2$.

12. The process of claim 11, wherein the syngas producing unit comprises a steam-methane-reformer ("SMR"), and/or an autothermal reformer ("ATR").

13. The process of claim 12, wherein:
    the reforming reactor comprises a SMR; and
    the SMR comprises: a plurality of SMR burners where a SMR fuel combusts to supply thermal energy to SMR; a radiant section heated by the thermal energy in which the hydrocarbon feed and steam reacts under the syngas producing conditions; a convection section heated by the thermal energy in which the hydrocarbon feed and steam are preheated before entering the radiant section.

14. The process of claim 13, wherein the reformed stream has a temperature from 750 to 900° C.

15. The process of claim 13, wherein the syngas producing process further comprises:
(E) heating the HPS stream generated in step (B) in the convection section of the SMR and/or an auxiliary furnace to obtain a super-heated HPS ("SH-HPS") stream having at least one of the following: a temperature from 350° C. to 550° C., and a pressure from 4,000 kPa to 14,000 kPa.

16. The process of claim 15, wherein a portion of the SH-HPS stream generated in step (E) is supplied to the one or more extraction turbine(s) and/or back-pressure turbine(s) in step (i).

17. The process of claim 12, wherein:
the reforming reactor comprises an ATR;
an $O_2$ stream is fed into the ATR;
the ATR comprises a reaction vessel into which the hydrocarbon feed, the steam feed, and the $O_2$ stream are supplied;
the reforming conditions comprises the presence of an ATR catalyst in the reaction vessel; and
the reformed stream has at least one of the following: a temperature from 800° C. to 1,100° C.; and an absolute pressure from 2,000 kPa to 5,000 kPa.

18. The process of claim 17, further comprising:
(E') heating the HPS stream generated in step (B) in an auxiliary furnace to obtain a super-heated HPS ("SH-HPS") stream having at least one of the following: a temperature from 350° C. to 550° C., and a pressure from 4,000 kPa to 14,000 kPa.

19. The process of claim 10, further comprising:
(F1) expanding the at least a portion of the SH-HPS stream produced in step (E) and/or step (E') in a first stage steam turbine to produce shaft power and an intermediate steam stream; and
(F2) expanding at least a portion of the intermediate steam stream in a second stage turbine to produce the exhaust steam stream, wherein the second stage turbine is an extraction turbine and/or a back-pressure turbine.

20. The process of claim 19, wherein the first stage turbine and/or the second stage turbine is selected from: (i) one or more turbines driving one or more process-gas compressors located on the olefins production plant; (ii) one or more turbines driving one or more propylene refrigeration compressors located on the olefins production plant; and (iii) one or more turbines driving one or more ethylene refrigeration compressors located on the olefins production plant.

21. The process of claim 19, wherein a portion of the SH-HPS stream generated in step (E) and/or step (E') is supplied to a turbine driving a pump located on the olefins production plant.

22. A process comprising:
(i) obtaining an exhaust steam stream having an absolute pressure from 200 kPa to 1,050 kPa exhausted from one or more extraction turbine(s) and/or back-pressure turbine(s) located in an olefins production plant, wherein the extraction turbine(s) and/or back-pressure turbine(s) drives one or more of the following: a process-gas compressor; a refrigeration compressor; and combinations thereof;
(ii) providing a gas mixture stream comprising $CO_2$;
(iii) feeding the gas mixture stream and a lean-amine stream comprising an amine into an absorption column;
(iv) obtaining a $CO_2$-rich amine stream and a $CO_2$-depleted residual gas stream from the absorption column;
(v) feeding at least a portion of the $CO_2$-rich amine stream into a separation column;
(vi) heating the at least a portion of the $CO_2$-rich amine stream in the separation column using the exhaust steam stream to produce an overhead stream rich in $CO_2$ and a bottoms stream rich in the amine; and
(vii) recycling at least a portion of the bottoms stream to the absorption column as at least a portion of the lean-amine stream.

23. The process of claim 22, wherein step (i) comprises:
(ia) providing a super-heated high-pressure steam (SH-HPS) stream;
(ib) expanding at least a portion of the SH-HPS stream in the at least one extraction turbine(s) and/or back-pressure turbine(s) to obtain the exhaust steam stream.

24. The process of claim 23, wherein the gas mixture stream is produced by a syngas producing process comprising:
(A) supplying a hydrocarbon feed and a steam feed into a syngas producing unit comprising a reforming reactor under syngas producing conditions to produce a reformed stream exiting the reforming reactor, wherein the syngas producing conditions include the presence of a reforming catalyst, and the reformed stream comprises $H_2$, CO, and steam;
(B) cooling the reformed stream by using a waste heat boiler ("WHB") to produce a cooled reformed stream and to generate a high-pressure steam ("HPS") stream;
(C) contacting the cooled reformed stream with a first shifting catalyst in a first shift reactor under a first set of shifting conditions to produce a first shifted stream exiting the first shift reactor, wherein the first shifted stream has a lower CO concentration and a higher $CO_2$ concentration than the first cooled reforming reactor effluent stream;
(D) obtaining the gas mixture stream from the first shifted stream;
(E) cooling the first shifted stream to obtain a cooled first shifted stream;
(F) contacting the cooled first shifted stream with a second shifting catalyst in a second shift reactor under a second set of shifting conditions to produce a second shifted stream exiting the second shift reactor, wherein the second shifted stream has a lower CO concentration and a higher $CO_2$ concentration than the cooled first shifted stream;
(G) abating the steam present in the second shifted stream to produce the gas mixture stream comprising $CO_2$ and $H_2$; the process further comprises:
(viii) heating the HPS stream generated in step (B) to obtain the SH-HPS stream, wherein the SH-HPS stream has at least one of the following: a temperature from 350° C. to 550° C., and a pressure from 4,000 kPa to 14,000 kPa.

25. The process of claim 22, wherein step (i) comprises:
(ia') providing a super-heated high-pressure steam (SH-HPS) stream;
(ib') expanding at least a portion of the SH-HPS stream in a first stage steam turbine to an intermediate steam stream; and
(ic') expanding the intermediate steam stream in a second stage turbine to obtain the exhaust steam stream, wherein the second stage turbine is an extraction turbine or a back-pressure turbine.

* * * * *